US012212996B2

(12) United States Patent
Sun et al.

(10) Patent No.: US 12,212,996 B2
(45) Date of Patent: Jan. 28, 2025

(54) MOBILITY MEASUREMENT METHOD IN RRC IDLE OR INACTIVE STATE AND DEVICE

(71) Applicant: VIVO MOBILE COMMUNICATION CO., LTD., Guangdong (CN)

(72) Inventors: Yanliang Sun, Guangdong (CN); Li Chen, Guangdong (CN); Xusheng Wei, Guangdong (CN); Sanjun Feng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 276 days.

(21) Appl. No.: 17/670,772

(22) Filed: Feb. 14, 2022

(65) Prior Publication Data
US 2022/0167201 A1 May 26, 2022

Related U.S. Application Data

(63) Continuation of application No. PCT/CN2020/104935, filed on Jul. 27, 2020.

(30) Foreign Application Priority Data

Aug. 15, 2019 (CN) .......................... 201910755144.0

(51) Int. Cl.
H04W 24/10 (2009.01)
H04W 24/08 (2009.01)
H04W 24/02 (2009.01)

(52) U.S. Cl.
CPC ........... *H04W 24/10* (2013.01); *H04W 24/08* (2013.01); *H04W 24/02* (2013.01)

(58) Field of Classification Search
CPC ...... H04B 17/15; H04B 17/29; H04B 17/309; H04W 24/02; H04W 24/08; H04W 24/10;
(Continued)

(56) References Cited

U.S. PATENT DOCUMENTS 9,661,509 B2 * 5/2017 Anepu .................. H04W 24/10
2014/0056168 A1 * 2/2014 Jung ..................... H04W 24/08
370/252

(Continued)

FOREIGN PATENT DOCUMENTS

CA 2996889 A1 3/2017
CN 102647767 A 8/2012
(Continued)

OTHER PUBLICATIONS

LG Electronics Inc., "Idle mode mobility for NB-Iot", 3GPP TSG-RAN WG2 Meeting #92, R2-156544, Anaheim, USA, Nov. 16-Nov. 20, 2015.

Primary Examiner — Shah M Rahman
(74) Attorney, Agent, or Firm — Price Heneveld LLP

(57) ABSTRACT

Embodiments of the present disclosure disclose a mobility measurement method in a radio resource control (RRC) idle or inactive state and a device. The method includes: adjusting measurement attribute information of inter-frequency frequencies, according to an inter-frequency measurement result and/or a serving cell measurement result of a terminal device and configuration information from a network device, where the measurement attribute information of the inter-frequency frequencies includes at least one of: a frequency type, a quantity of frequencies of different frequency types, or a measurement requirement of frequencies of different frequency types, the frequency type includes a first performance frequency or a second performance frequency, and a measurement requirement of the second performance frequency is lower than a measurement requirement of the first performance frequency.

20 Claims, 7 Drawing Sheets

(58) Field of Classification Search
CPC ... H04W 48/16; H04W 52/0229; H04W 8/24; H04W 52/0212; H04W 8/22; Y02D 30/70
See application file for complete search history.

(56) References Cited

U.S. PATENT DOCUMENTS

| | | | |
|---|---|---|---|
| 2014/0362716 A1 | 12/2014 | Zhang et al. | |
| 2016/0212642 A1* | 7/2016 | Ljung | H04W 76/28 |
| 2017/0086108 A1 | 3/2017 | Meshkati et al. | |
| 2018/0176710 A1* | 6/2018 | Jang | H04W 24/10 |
| 2018/0323884 A1 | 11/2018 | Ku et al. | |
| 2019/0069192 A1* | 2/2019 | Palenius | H04W 24/10 |
| 2019/0116461 A1* | 4/2019 | Callender | H04W 36/0088 |
| 2019/0254110 A1* | 8/2019 | He | H04L 5/0048 |
| 2019/0319686 A1* | 10/2019 | Chen, IV | H04W 72/046 |
| 2019/0364451 A1 | 11/2019 | Yang | |
| 2020/0022011 A1* | 1/2020 | Lee | H04W 24/10 |
| 2021/0392525 A1* | 12/2021 | Kaikkonen | H04B 7/0695 |
| 2022/0014943 A1* | 1/2022 | Zhang | H04W 48/20 |
| 2022/0131596 A1* | 4/2022 | Sharma | H04B 7/0888 |
| 2022/0232471 A1* | 7/2022 | Laselva | H04W 24/10 |
| 2022/0248308 A1* | 8/2022 | Chen | H04W 52/0216 |
| 2022/0353650 A1* | 11/2022 | Aldana | H04W 4/40 |

FOREIGN PATENT DOCUMENTS

| | | | | |
|---|---|---|---|---|
| CN | 103220702 A | 7/2013 | | |
| CN | 108029050 A | 5/2018 | | |
| CN | 108574955 A | 9/2018 | | |
| EP | 2779745 A1 * | 9/2014 | | H04W 36/0088 |
| EP | 3955652 A1 * | 2/2022 | | H04W 24/02 |
| KR | 20190088473 A | 7/2019 | | |
| WO | 2007089128 A1 | 8/2007 | | |
| WO | WO-2013110735 A2 * | 8/2013 | | H04W 48/20 |
| WO | 2018204863 A1 | 11/2018 | | |
| WO | 2018205387 A1 | 11/2018 | | |

\* cited by examiner

MOBILITY MEASUREMENT METHOD IN RRC IDLE OR INACTIVE STATE AND DEVICE

CROSS-REFERENCE TO RELATED APPLICATIONS

The present application is a bypass continuation application of International Application No. PCT/CN2020/104935 filed on Jul. 27, 2020, which claims the priority of Chinese Patent Application No. 201910755144.0 filed in China on Aug. 15, 2019, the entire contents of which are hereby incorporated by reference in their entireties.

TECHNICAL FIELD

The present disclosure discloses the field of wireless communication technologies, and in particular, to a mobility measurement method in an RRC idle or inactive state and a device.

BACKGROUND

As defined in New Radio (NR) protocols, in a radio resource control (RRC) idle state or an RRC inactive state, user equipment (UE) needs to monitor at least seven inter-frequency frequencies and implement cell reselection based on the detection result within a time specified in the protocol. From the perspective of power consumption, monitoring too many frequencies will prolong the wake-up duration for the UE to wake up from discontinuous reception (DRX), resulting in increased power consumption of the UE. Especially, in NR, a series of Synchronization Signal and PBCH Blocks (SSBs) need to be received in the detection of each frequency to perform wake-up, and the Synchronization Measurement Timing Configuration (SMTC) of the inter-frequency SSB may not be fully aligned with the moment at which the UE wakes up from DRX. As a result, the UE needs to wait in light sleep mode for the arrival of an inter-frequency SMTC time window, and the power consumption of the UE is increased.

Specific mechanisms of normal performance frequencies and low performance frequencies defined in Long Term Evolution (LTE) R12 are as follows:
(1) A UE capability is defined. A terminal device without the UE capability only needs to monitor three LTE frequencies at most, and a terminal device with the UE capability monitors seven frequencies, including three normal performance frequencies and four low performance frequencies.
(2) A terminal device with the UE capability in (1) reads frequency-related performance requirement indication information configured by a network device in a System Information Block (SIB) message, and determines normal performance frequencies and low performance frequencies based on the information. A terminal device without the UE capability in (1) does not need to read the performance requirement indication information, and may randomly select three frequencies from all frequencies for monitoring.
(3) The minimum monitoring duration (that is, a minimum measurement time interval) required for a low performance frequency is six times that for a normal performance frequency. That is, the measurement requirement is reduced to one sixth.

SUMMARY

An objective of embodiments of the present disclosure is to provide a mobility measurement method in an RRC idle or inactive state and a device.

To resolve the foregoing technical problems, the embodiments of the present disclosure are implemented as follows:

According to a first aspect, the embodiments of the present disclosure provide a mobility measurement method in an RRC idle or inactive state, applicable to a terminal device, the method including: adjusting measurement attribute information of inter-frequency frequencies, according to an inter-frequency measurement result and/or a serving cell measurement result of the terminal device and configuration information from a network device, where the inter-frequency frequencies are configured by the network device, the measurement attribute information of the inter-frequency frequencies includes at least one of: a frequency type, a quantity of frequencies of different frequency types, or a measurement requirement of frequencies of different frequency types, the frequency type includes a first performance frequency or a second performance frequency, and a measurement requirement of the second performance frequency is lower than a measurement requirement of the first performance frequency.

According to a second aspect, the embodiments of the present disclosure further provide a mobility measurement method in an RRC idle or inactive state, applicable to a network device, the method including: configuring inter-frequency frequencies and configuration information for a terminal device, where the terminal device is configured to adjust measurement attribute information of the inter-frequency frequencies according to an inter-frequency measurement result and/or a serving cell measurement result and the configuration information, where the measurement attribute information of the inter-frequency frequencies includes at least one of: a frequency type, a quantity of different frequencies, or a measurement requirement of frequencies of different frequency types, the frequency type includes a first performance frequency or a second performance frequency, and a measurement requirement of the second performance frequency is lower than a measurement requirement of the first performance frequency.

According to a third aspect, the embodiments of the present disclosure further provide a terminal device, including: an adjustment module, configured to adjust measurement attribute information of inter-frequency frequencies, according to an inter-frequency measurement result and/or a serving cell measurement result of the terminal device and configuration information from a network device, where the inter-frequency frequencies are configured by the network device, the measurement attribute information of the inter-frequency frequencies includes at least one of: a frequency type, a quantity of frequencies of different frequency types, or a measurement requirement of frequencies of different frequency types, the frequency type includes a first performance frequency or a second performance frequency, and a measurement requirement of the second performance frequency is lower than a measurement requirement of the first performance frequency.

According to a fourth aspect, the embodiments of the present disclosure further provide a network device, including: a configuration module, configured to configure inter-frequency frequencies and configuration information for a terminal device, where the terminal device is configured to adjust measurement attribute information of the inter-frequency frequencies according to an inter-frequency measurement result and/or a serving cell measurement result and the configuration information, where the measurement attribute information of the inter-frequency frequencies includes at least one of: a frequency type, a quantity of different frequencies, or a measurement requirement of frequencies of different frequency types, the frequency type includes a first performance frequency or a second performance frequency, and a measurement requirement of the second performance frequency is lower than a measurement requirement of the first performance frequency.

According to a fifth aspect, the embodiments of the present disclosure further provide a terminal device, including: a memory, storing a computer program instruction; and a processor, when executing the computer program instruction, implementing the mobility measurement method in an RRC idle or inactive state in the foregoing first aspect.

According to a sixth aspect, the embodiments of the present disclosure further provide a network device, including: a memory, storing a computer program instruction; and a processor, when executing the computer program instruction, implementing the mobility measurement method in an RRC idle or inactive state in the foregoing second aspect.

According to a seventh aspect, the embodiments of the present disclosure further provide a computer-readable storage medium, where the computer-readable storage medium includes instructions, and the instructions, when run on a computer, cause the computer to perform the mobility measurement method in an RRC idle or inactive state in the foregoing first aspect or second aspect.

BRIEF DESCRIPTION OF THE DRAWINGS

To describe the technical solutions of the embodiments of the present disclosure or the related art more clearly, the following briefly introduces the accompanying drawings required for describing the embodiments or the related art. Apparently, the accompanying drawings in the following description show only some embodiments recorded in the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

The technical solutions of the present disclosure may be applied to various communications systems, such as: a Global System for Mobile Communications (GSM), a Code Division Multiple Access (CDMA) system, Wideband Code Division Multiple Access (WCDMA), a general packet radio service (GPRS), and LTE/LTE Advanced (LTE-A), and NR.

UE, also referred to as a terminal device (mobile terminal), mobile UE or the like, may communicate with one or more core networks through a radio access network (RAN) or the like. The UE may be a terminal device such as a mobile phone (also referred to as a "cellular" phone) and a computer with a terminal device. For example, the UE may be a portable, pocket-sized, handheld, computer built-in, or in-vehicle mobile apparatus, which exchanges languages and/or data with the RAN.

A base station may be a base transceiver station (BTS) in GSM or CDMA, or may be a NodeB in WCDMA, or may be an evolved NodeB (eNB or e-NodeB) and a 5G base station (gNB) in LTE. This is not limited in the present disclosure. However, for ease of description, the following embodiments are described by using a gNB as an example.

The following describes the technical solution provided in each embodiment of the present disclosure in detail with reference to the accompanying drawings.

Figure 1:
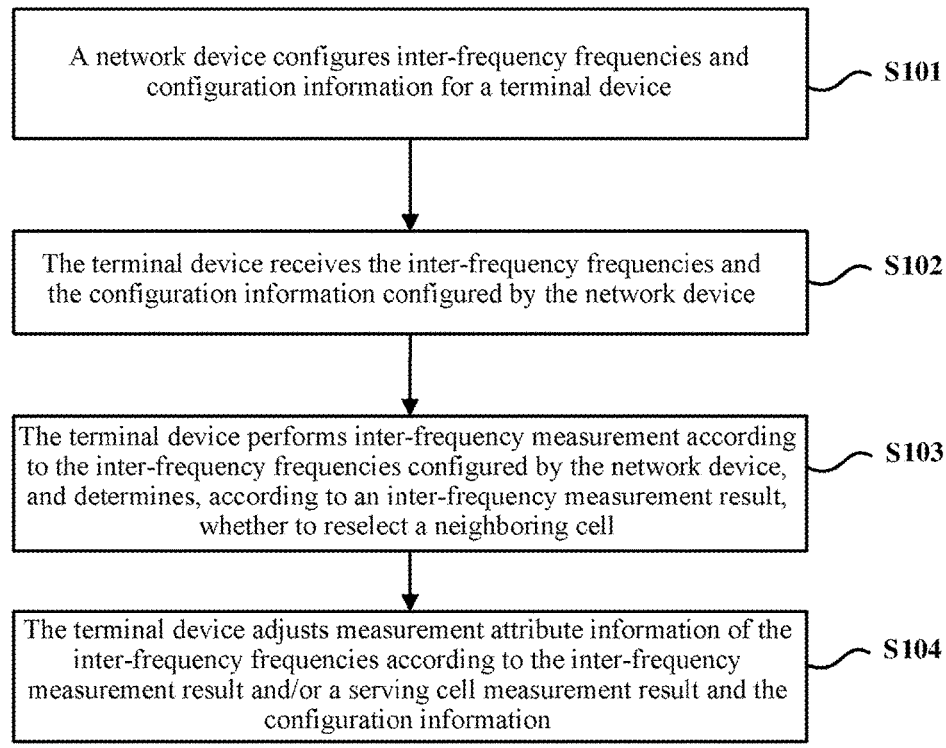
FIG. 1 is a schematic flowchart of a mobility measurement method in an RRC idle or inactive state according to an embodiment of the present disclosure.

FIG. 1 is a schematic flowchart of a mobility measurement method in an RRC idle or inactive state according to an embodiment of the present disclosure. The method in FIG. 1 is applicable to a terminal device and a network device and may include the following steps.

S101: The network device configures inter-frequency frequencies and configuration information for the terminal device.

The configuration information may include a preset signal quality threshold group, and the preset signal quality threshold group may include one or more thresholds.

S102: The terminal device receives the inter-frequency frequencies and the configuration information configured by the network device.

S103: The terminal device performs inter-frequency measurement according to the inter-frequency frequencies configured by the network device, and determines, according to an inter-frequency measurement result, whether to reselect a neighboring cell.

S104: The terminal device adjusts measurement attribute information of the inter-frequency frequencies according to the inter-frequency measurement result and/or a serving cell measurement result and the configuration information.

An execution order of S103 and S104 is not limited.

The inter-frequency measurement result is obtained by measuring signal quality of the inter-frequency frequencies by the terminal device. The serving cell measurement result is obtained by measuring signal quality of a serving cell on which the terminal device currently camps by the terminal device. The signal quality includes a reference signal received power (RSRP) and/or a reference signal received quality (RSRQ), and the measurement result includes an RSRP measurement result and/or an RSRQ measurement result.

The measurement attribute information of the inter-frequency frequencies includes at least one of: a frequency type, a quantity of frequencies of different frequency types, or a measurement requirement of frequencies of different frequency types. The frequency type includes a first performance frequency or a second performance frequency.

The first performance frequency and the second performance frequency have different measurement requirements, and a measurement requirement of the second performance frequency is lower than a measurement requirement of the first performance frequency.

The measurement requirement may include requirements such as a measurement time interval and a measurement sampling point quantity. The measurement requirement may be positively correlated or negatively correlated to a specific requirement value. For example, the measurement requirement is a measurement time interval, and the requirement value is a specific value of the measurement time interval. When the value of the measurement time interval is larger, it indicates that the measurement requirement is lower. In comparison, when the value of the measurement time interval is smaller, it indicates that the measurement requirement is higher. As can be seen, the measurement requirement in the example is negatively correlated to a specific requirement value. In another example, the measurement requirement is a measurement sampling point quantity. When the measurement sampling point quantity is larger, it indicates that the measurement requirement is higher. In comparison, when the measurement sampling point quantity is smaller, it indicates that the measurement requirement is lower. As can be seen, the measurement requirement in the example is positively correlated to a specific requirement value.

Based on the foregoing description of the measurement requirements of the first performance frequency and the second performance frequency, the first performance frequency may be a normal performance frequency, and the second performance frequency may be a low performance frequency. The low performance frequency is discussed with respect to the normal performance frequency. That is, a measurement requirement of the low performance frequency is lower than that of the normal performance frequency.

In the embodiments of the present disclosure, a first performance frequency and a second performance frequency with different measurement requirements are introduced, and measurement attribute information (including at least one of: a quantity of frequencies of different frequency types, a frequency type, or a measurement requirement of frequencies of different frequency types) of inter-frequency frequencies is adjusted according to an inter-frequency measurement result and/or a serving cell measurement result of a terminal device, to implement the controllability of the behavior of the terminal device and dynamically adjust inter-frequency frequencies, so that when detecting inter-frequency frequencies, the terminal device can reduce unnecessary radio resource management measurement, thereby reducing the power consumption of UE.

An example in which the first performance frequency is a normal performance frequency and the second performance frequency is a low performance frequency is used below to describe the mobility measurement method in an RRC idle or inactive state provided in the foregoing embodiments. In addition, various thresholds or threshold values in the following embodiments may all be configured by the network device.

Embodiment 1

If a terminal device measures that a normal performance frequency meets any following condition, the normal performance frequency is adjusted to a low performance frequency (that is, an entry condition):

A1: Within a first duration $T\_1$, signal quality of the normal performance frequency remains less than a first threshold $L\_1$.

When the entry condition is A1, a preset signal quality threshold group configured by a network device only includes the first threshold $L\_1$.

A2: Within a first duration $T\_1$, signal quality of the normal performance frequency remains less than a first threshold $L\_1$, and signal quality of a serving cell remains greater than a second threshold $L\_f1$.

When the entry condition is A2, a preset signal quality threshold group configured by a network device includes the first threshold $L\_1$ and the second threshold $L\_f1$.

A3: Within a first duration $T\_1$, signal quality of the normal performance frequency remains less than a first threshold $L\_1$, and signal quality fluctuation of a serving cell remains less than a second threshold $L\_f1$.

When the entry condition is A3, a preset signal quality threshold group configured by a network device includes the first threshold $L\_1$ and the second threshold $L\_f1$.

A4: Within a first duration $T\_1$, a difference between signal quality of the normal performance frequency and signal quality of a serving cell remains greater than a third threshold $L\_3$.

When the entry condition is A4, a preset signal quality threshold group configured by a network device only includes the third threshold $L\_3$.

A5: Within a first duration $T\_1$, a difference between signal quality of the normal performance frequency and signal quality of a serving cell remains greater than a third threshold $L\_3$, and the signal quality of the serving cell remains greater than a second threshold $L\_f1$.

When the entry condition is A5, a preset signal quality threshold group configured by a network device includes the second threshold $L\_f1$ and the third threshold $L\_3$.

A6: Within a first duration $T\_1$, a difference between signal quality of the normal performance frequency and signal quality of a serving cell remains greater than a third threshold $L\_3$, and signal quality fluctuation of the serving cell remains less than a second threshold $L\_f1$.

When the entry condition is A6, a preset signal quality threshold group configured by a network device includes the second threshold L_f1 and the third threshold L_3.

In the conditions A4 to A6, the difference between the signal quality of the normal performance frequency and the signal quality of the serving cell refers to a value of subtracting maximum signal quality of the normal performance frequency from the signal quality of the serving cell. For example, if the serving cell is denoted as [Frequency f]_serv and the normal performance frequency is denoted as f_x, the condition A4 is: within the first duration T_1, a signal quality difference of f_serv−f_x remains greater than L_3.

A7: Within a first duration T_1, signal quality of the normal performance frequency remains greater than a first threshold L_1, and a difference between the signal quality of the first performance frequency and signal quality of a first normal performance frequency with the highest signal quality in an inter-frequency measurement result remains greater than a fourth threshold L_f2.

When the entry condition is A7, a preset signal quality threshold group configured by a network device includes the first threshold L_1 and the fourth threshold L_f2.

A difference between signal quality of the first performance frequency and signal quality of the first normal performance frequency with the highest signal quality in the inter-frequency measurement result refers to a value of subtracting, from the signal quality of the first normal performance frequency, the maximum signal quality of the normal performance frequency with signal quality that remains greater than the first threshold L_1. If the first normal performance frequency is denoted as f_m and the normal performance frequency with signal quality that remains greater than the first threshold L_1 is denoted as f_x, the condition A7 is: within the first duration T_1, a signal quality difference of f_m−f_x remains greater than L_f2.

If the terminal device measures that the normal performance frequency meets any following condition, the low performance frequency is adjusted to the normal performance frequency (that is, an exit condition):

B1: Within a second duration T_2, signal quality of the low performance frequency remains greater than a fifth threshold L_2.

When the exit condition is B1, the preset signal quality threshold group configured by the network device only includes the fifth threshold L_2.

B2: Within a second duration T_2, a difference between signal quality of the low performance frequency and the signal quality of the serving cell remains less than a sixth threshold L_4.

When the exit condition is B2, the preset signal quality threshold group configured by the network device only includes the sixth threshold L_4.

The difference between the signal quality of the low performance frequency and the signal quality of the serving cell refers to a value of subtracting maximum signal quality of the low performance frequency from the signal quality of the serving cell. If the serving cell is denoted as a frequency f_serv and a low performance frequency is denoted as f_y, the condition B2 is: within the second duration T_2, a signal quality difference of f_serv−f_y remains less than L_4.

B3: Within a second duration T_2, signal quality of the low performance frequency remains less than a fifth threshold L_2, and the difference between signal quality of the first performance frequency and the signal quality of the first normal performance frequency with the highest signal quality in the inter-frequency measurement result remains less than a seventh threshold L_f3.

When the exit condition is B3, the preset signal quality threshold group configured by the network device includes the fifth threshold L_2 and the seventh threshold L_f3.

The difference between the signal quality of the first performance frequency and the signal quality of the first normal performance frequency with the highest signal quality in the inter-frequency measurement result refers to a value of subtracting, from the signal quality of the first normal performance frequency, maximum signal quality of a low performance frequency with signal quality that remains less than the fifth threshold L_2. If the first normal performance frequency is denoted as f_m and the low performance frequency with signal quality that remains less than the fifth threshold L_2 is denoted as f_y, the condition B3 is: within the second duration T_2, a signal quality difference of f_m−f_y remains less than L_f3.

B4: Within a second duration T_2, signal quality of the low performance frequency remains less than a fifth threshold L_2, and the signal quality of the serving cell remains less than a tenth threshold L_f4.

When the exit condition is B4, the preset signal quality threshold group configured by the network device includes the fifth threshold L_2 and the tenth threshold L_f4.

B5: Within a second duration T_2, signal quality of the low performance frequency remains less than a fifth threshold L_2, and the signal quality fluctuation of the serving cell remains greater than a tenth threshold L_f4.

When the exit condition is B5, the preset signal quality threshold group configured by the network device includes the fifth threshold L_2 and the tenth threshold L_f4.

In Embodiment 1, units of all thresholds (including the first threshold L_1, the second threshold L_f1, the third threshold L_3, the fourth threshold L_f2, the fifth threshold L_2, the sixth threshold L_4, the seventh threshold L_f3, and the tenth threshold L_f4) are all dB, and all thresholds may be configured based on protocol definitions or by the network device.

In Embodiment 1, the threshold L_2 is usually greater than the threshold L_1, to reduce a quantity of times of entering or exiting the low performance frequency, that is, to reduce a quantity of times of adjusting a frequency type of the low performance frequency. The second threshold L_f1 is a threshold value of signal quality of a serving cell on which the terminal device currently camps.

In addition, in Embodiment 1, a measurement time interval in measurement requirements of low performance frequencies may be further adjusted. For example, a measurement time interval of a low performance frequency is increased. Because the measurement time interval of the low performance frequency is greater than the measurement time interval of the normal performance frequency the measurement time interval of the low performance frequency is increased, the measurement behavior of the low performance frequencies by UE can be reduced, thereby reducing the power consumption of the UE.

It should be noted that, in Embodiment 1, a frequency quantity of low performance frequencies is not fixed. By default, when the UE camps on a serving cell and starts to measure inter-frequency frequencies, the first duration T_1 and the second duration T_2 are only valid for a frequency with the inter-frequency measurement result.

Figure 2:
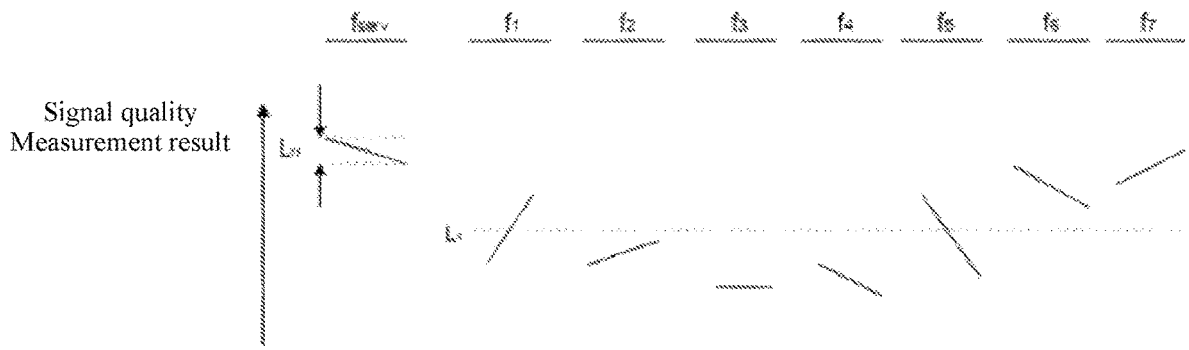
FIG. 2 is a schematic curve diagram of signal quality in a mobility measurement method in an RRC idle or inactive state according to an embodiment of the present disclosure.

For example, FIG. 2 is a schematic curve diagram of maximum signal quality in a serving cell (a frequency f_serv) on which the UE currently camps and inter-frequency frequencies f_1 to f_7 of seven neighboring cells measured by the UE within the first duration T_1. Assuming that at this time the inter-frequency frequencies f_1 to f_7 are all normal performance frequencies, based on measurement results of the UE within the first duration T_1, it may be found that measurement results of signal quality of the inter-frequency frequencies f_2, f_3, and f_4 remain less than the threshold L_1, and the entry condition is met. Therefore, frequency types of the inter-frequency frequencies f_2, f_3, and f_4 may be adjusted to the low performance frequencies.

Optionally, a signal quality threshold value of the serving cell (the frequency f_serv) on which the UE currently camps is defined as L_f1 (that is, the second threshold L_f1 in Embodiment 1). For a normal performance frequency with signal quality that remains less than the threshold L_1, when the signal quality of the serving cell measured by the UE within the first duration T_1 remains greater than L_f1 or signal quality fluctuation of the serving cell remains less than L_f1, the corresponding normal performance frequency may be adjusted to a low performance frequency.

Optionally, signal quality threshold values L_f2 and L_f3 (that is, the fourth threshold L_f2 and the seventh threshold L_f3 in Embodiment 1) and a normal performance frequency f_m with the highest signal quality in the measurement results are defined. When a difference of signal quality between the normal performance frequency with signal quality that remains greater than the threshold L_1 and the normal performance frequency with the highest signal quality measured by the UE within the first duration T_1 (that is, a value of subtracting the signal quality of the normal performance frequency with signal quality that remains greater than the threshold L_1 from signal quality of the normal performance frequency f_m with the highest signal quality) is greater than L_f2, the corresponding normal performance frequency may be adjusted to a low performance frequency.

Figure 3:
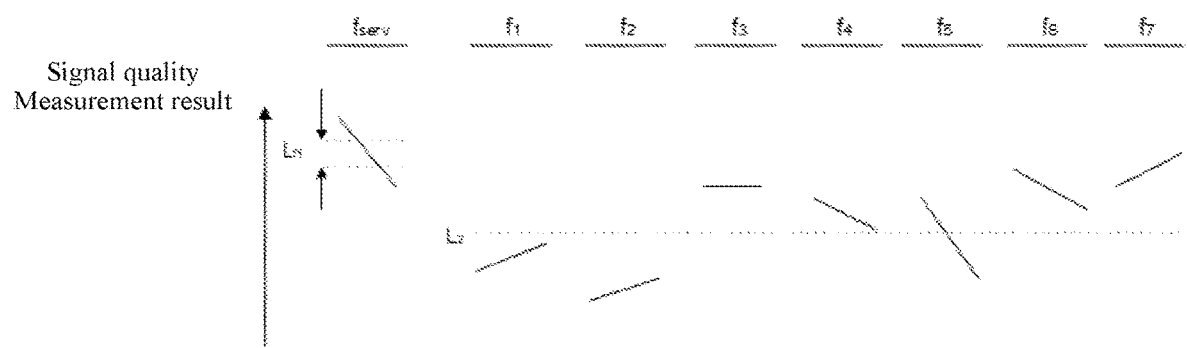
FIG. 3 is a schematic curve diagram of signal quality in a mobility measurement method in an RRC idle or inactive state according to another embodiment of the present disclosure.

FIG. 3 is a schematic curve diagram of the maximum signal quality in the serving cell (the frequency f_serv) on which the UE currently camps and inter-frequency frequencies f_1 to f_7 of seven neighboring cells measured by the UE within the second duration T_2. Assuming that at this time the inter-frequency frequencies f_2, f_3, f_4, and f_5 are all low performance frequencies, based on measurement results of the UE within the second duration T_2, it may be found that measurement results of signal quality of the inter-frequency frequencies f_3 and f_4 remain greater than the threshold L_2, and an exit condition is met. Therefore, frequency types of the inter-frequency frequencies f_3 and f_4 may be adjusted to normal performance frequencies.

Optionally, when the UE measures within the second duration T_2 that the signal quality of the serving cell (the frequency f_serv) on which the UE currently camps remains less than the threshold L_f1 (that is, a signal quality threshold value of the serving cell), or signal quality fluctuation of the serving cell (the frequency f_serv) remains greater than the threshold L_f1, the low performance frequency with signal quality less than the threshold L_2 within the second duration T_2 may be adjusted to a normal performance frequency.

Optionally, signal quality threshold values L_f2 and L_f3 (that is, the fourth threshold L_f2 and the seventh threshold L_f3 in Embodiment 1) and a normal performance frequency f_m with the highest signal quality in the measurement results are defined. When a difference of signal quality between the low performance frequency with signal quality that remains less than the threshold L_2 and the normal performance frequency with the low signal quality measured by the UE within the second duration T_2 (that is, a value of subtracting the signal quality of the low performance frequency with signal quality that remains less than the threshold L_2 from the signal quality of the normal performance frequency f_m with the highest signal quality) is less than L_f3, the corresponding low performance frequency may be adjusted to the normal performance frequency.

Figure 4:
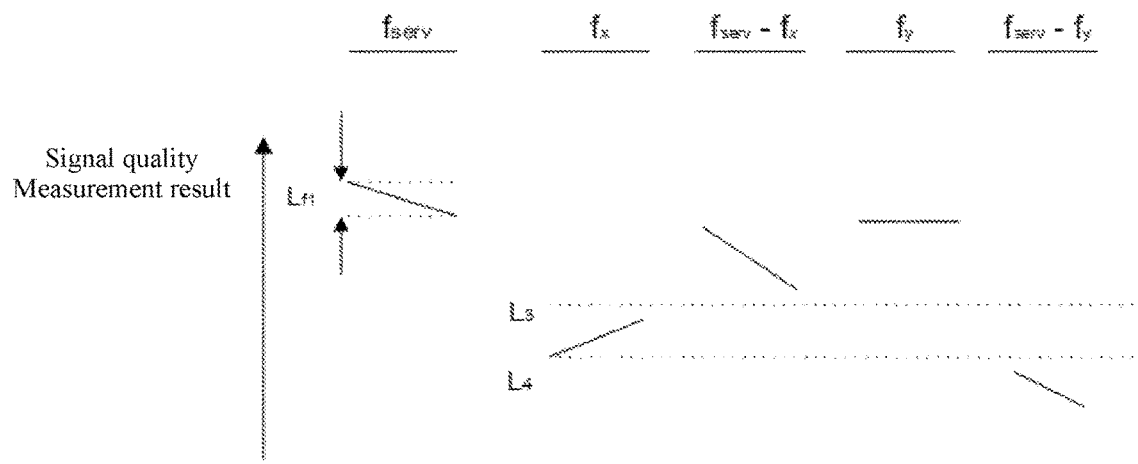
FIG. 4 is a schematic curve diagram of signal quality in a mobility measurement method in an RRC idle or inactive state according to still another embodiment of the present disclosure.

FIG. 4 shows a normal performance frequency f_x and a low performance frequency f_y in inter-frequency frequencies and signal quality differences of f_serv−f_x at different moments and signal quality differences of f_serv−f_y at different moments. f_serv is a frequency of a serving cell on which the UE currently camps.

Based on measurement results shown in FIG. 4, for the normal performance frequency f_x, when the UE measures that a signal quality difference of f_serv−f_x remains greater than the threshold L_3 within the first duration T_1, the normal performance frequency f_x is adjusted to a low performance frequency. For the low performance frequency f_y, when the UE measures that a signal quality difference of f_serv−f_y remains less than the threshold L_4 within the second duration T_2, the low performance frequency f_y is adjusted to a normal performance frequency.

Optionally, a signal quality threshold value of the serving cell (the frequency f_serv) on which the UE currently camps is defined as L_f1 (that is, the second threshold L_f1 in Embodiment 1). For the normal performance frequency f_x with the signal quality difference of f_serv−f_x that remains greater than the threshold L_3 within the first duration T_1, when the UE measures that signal quality of the serving cell remains greater than L_f1 or signal quality fluctuation of the serving cell remains less than L_f1, the normal performance frequency f_x is adjusted to a low performance frequency. For the low performance frequency f_y, when the UE measures that the signal quality of the serving cell remains less than the threshold L_f1 within the second duration T_2 or signal quality fluctuation of the serving cell remains greater than the threshold L_f1 within the second duration T_2, the low performance frequency f_y may be adjusted to the normal performance frequency.

In the foregoing embodiments, the threshold L_3 is usually greater than the threshold L_4, to reduce the quantity of times of entering or exiting the low performance frequency, that is, to reduce the quantity of times of adjusting a frequency type of a low performance frequency.

Embodiment 2

Figure 5:
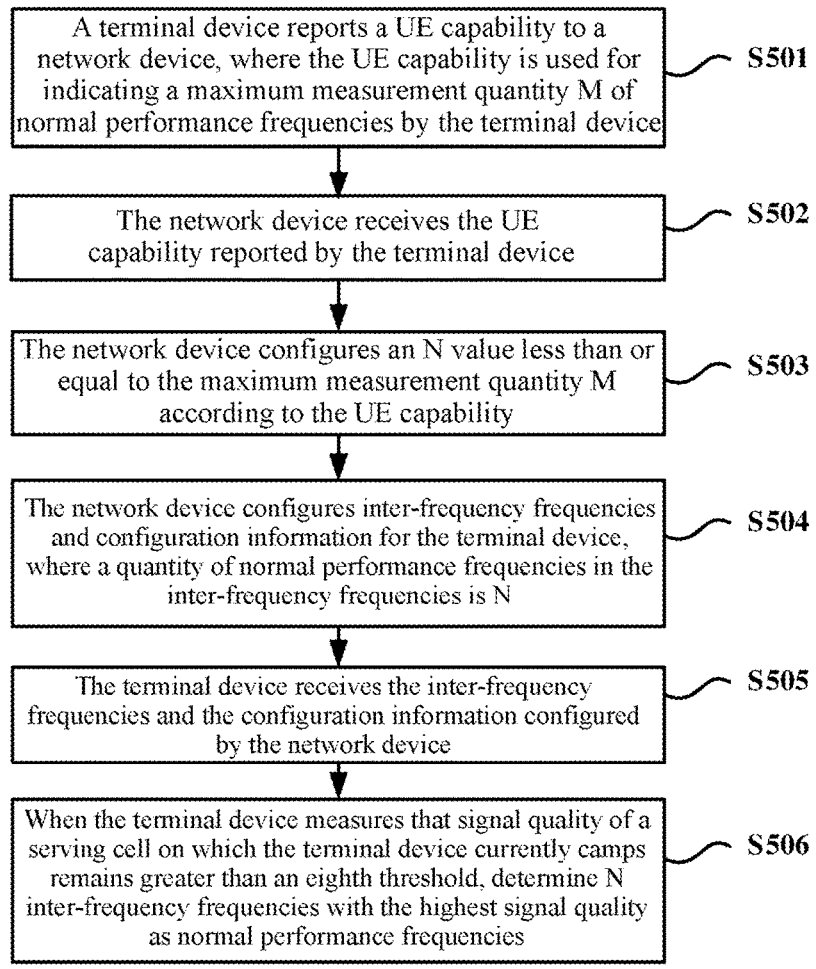
FIG. 5 is a schematic flowchart of a mobility measurement method in an RRC idle or inactive state according to another embodiment of the present disclosure.

FIG. 5 is a schematic flowchart of a mobility measurement method in an RRC idle or inactive state according to another embodiment of the present disclosure. The method in FIG. 5 is applicable to a terminal device and a network device and may include the following steps.

S501: The terminal device reports a UE capability to the network device, where the UE capability is used for indicating a maximum measurement quantity M of the normal performance frequencies by the terminal device.

S502: The network device receives the UE capability reported by the terminal device.

S503: The network device configures an N value less than or equal to the maximum measurement quantity M according to the UE capability.

The N value is a quantity of first performance frequencies to be adjusted by the terminal device.

S504: The network device configures inter-frequency frequencies and configuration information for the terminal device, where a quantity of normal performance frequencies in the inter-frequency frequencies is N.

The configuration information may include a preset signal quality threshold group, and the preset signal quality threshold group may include one or more thresholds.

S505: The terminal device receives the inter-frequency frequencies and the configuration information configured by the network device.

S506: When the terminal device measures that signal quality of a serving cell on which the terminal device currently camps remains greater than an eighth threshold, determine N inter-frequency frequencies with the highest signal quality as normal performance frequencies.

An inter-frequency measurement result is obtained by measuring the signal quality of the inter-frequency frequencies by the terminal device. A serving cell measurement result is obtained by measuring the signal quality of the serving cell on which the terminal device currently camps by the terminal device. The signal quality includes an RSRP and/or an RSRQ, and the measurement result includes an RSRP measurement result and/or an RSRQ measurement result.

In Embodiment 2, the network device can configure, for the terminal device according to the UE capability reported by the terminal device, that the quantity of normal performance frequencies is N, so that the configured N value is less than or equal to the maximum measurement quantity M of the normal performance frequencies by the terminal device, to make the quantity of normal performance frequencies measured by the terminal device match the UE capability, to avoid that the configuration of excess normal performance frequencies increases the power consumption of UE.

In the foregoing embodiments, when determining N inter-frequency frequencies with the highest signal quality as normal performance frequencies, the terminal device may determine N inter-frequency frequencies with the highest signal quality corresponding to an end moment of a particular duration as normal performance frequencies, that is, determine N inter-frequency frequencies with the highest signal quality after smooth filtering as normal performance frequencies.

Embodiment 3

If a terminal device measures that signal quality of a serving cell (the frequency f_serv) on which UE currently camps remains greater than an eighth threshold L_5 within a third duration T_3, it is determined that the quantity of normal performance frequencies is N=K_s1; then, K_s1 inter-frequency frequencies with the highest signal quality are obtained through filtering, the K_s1 inter-frequency frequencies obtained through filtering are configured as normal performance frequencies, and the remaining inter-frequency frequencies are configured as low performance frequencies.

Figure 6:
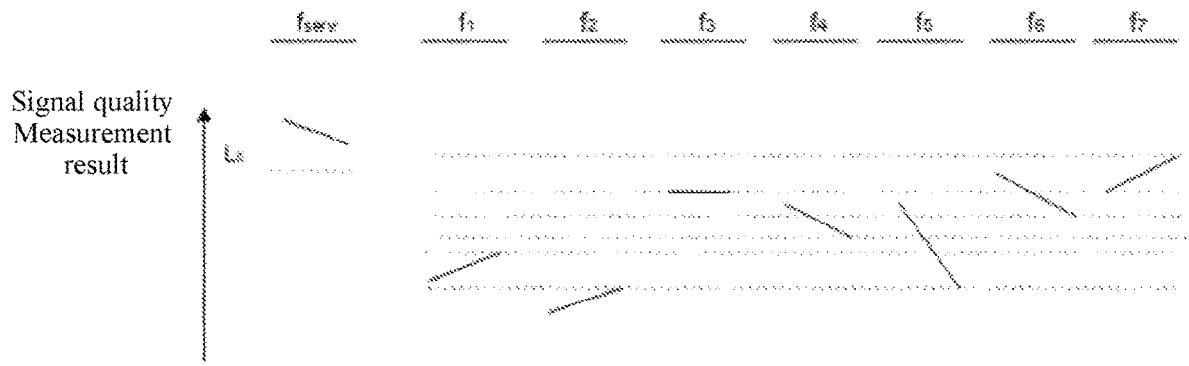
FIG. 6 is a schematic curve diagram of signal quality in a mobility measurement method in an RRC idle or inactive state according to still another embodiment of the present disclosure.

As shown in FIG. 6, the quantity of normal performance frequencies configured by the network device or defined in the protocol is K_c, and the terminal device adjusts K_c to K_s1. Assuming that K_c=3 after adjustment, in this case, according to the signal quality measurement results shown in FIG. 6, it may be obtained through filtering that the inter-frequency frequencies f_3, f_6, and f_7 with the highest signal quality after smooth filtering (that is, an end moment of the third duration T_3) are normal performance frequencies, and the remaining inter-frequency frequencies f_1, f_2, f_4, and f_5 are configured as low performance frequencies.

Optionally, when the UE measures within a fourth duration T_4 that the signal quality of the serving cell (the frequency f_serv) on which the UE currently camps remains less than the threshold L_6, all the inter-frequency frequencies are configured as the normal performance frequencies.

In the foregoing Embodiment 2 or Embodiment 3, when the terminal device determines K_s1 inter-frequency frequencies with the highest signal quality as normal performance frequencies, if there is at least one unmeasured frequency, the terminal device determines K_s1 inter-frequency frequencies with the highest signal quality in a measured frequency group as normal performance frequencies; or, marks unmeasured frequencies as normal performance frequencies, performs measurement on the marked unmeasured frequencies, then updates the unmeasured frequencies with a generated inter-frequency measurement result as measured frequencies, and determines K_s1 inter-frequency frequencies with the highest signal quality in an updated measured frequency group as normal performance frequencies.

Embodiment 4

Figure 7:
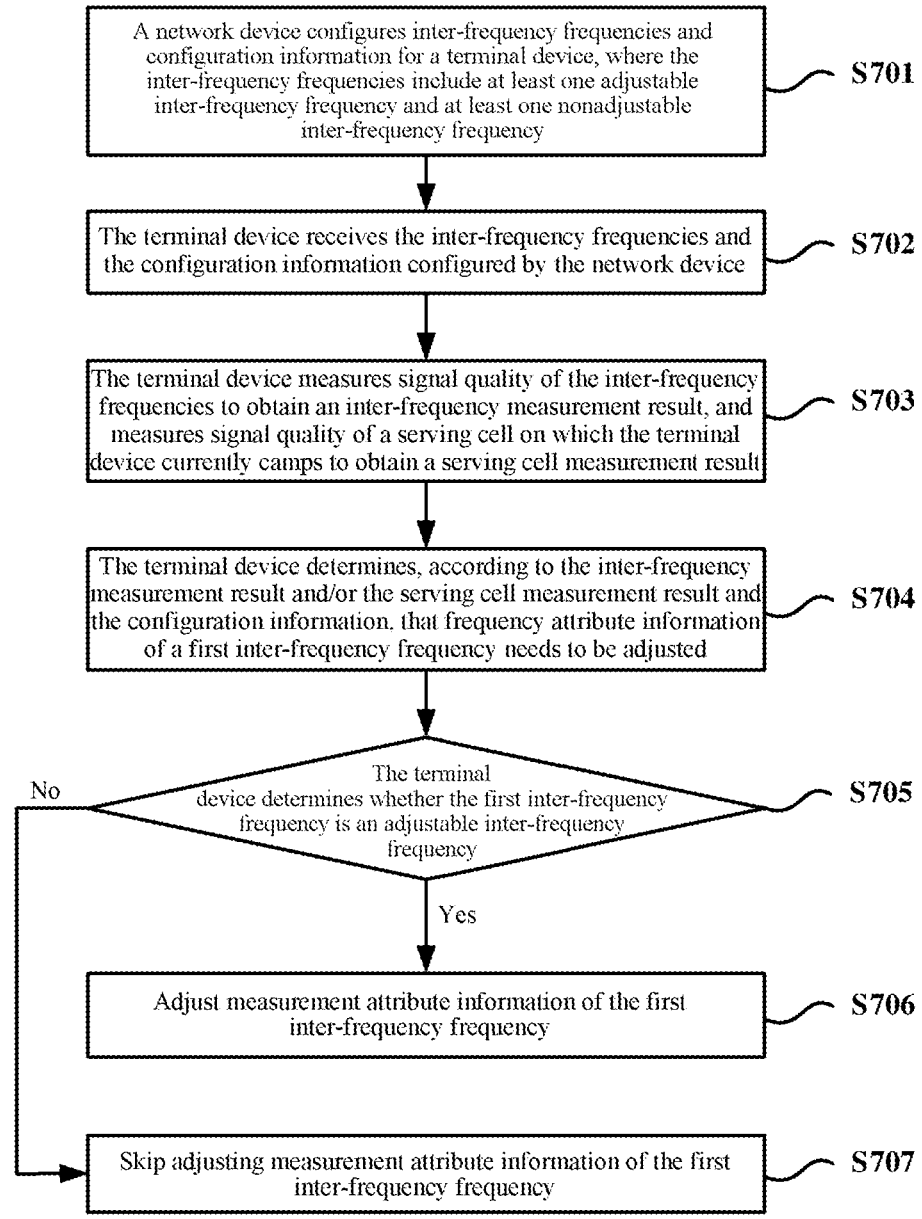
FIG. 7 is a schematic flowchart of a mobility measurement method in an RRC idle or inactive state according to still another embodiment of the present disclosure.

FIG. 7 is a schematic flowchart of a mobility measurement method in an RRC idle or inactive state according to still another embodiment of the present disclosure. The method in FIG. 7 is applicable to a terminal device and a network device and may include the following steps.

S701: The network device configures inter-frequency frequencies and configuration information for the terminal device, where the inter-frequency frequencies include at least one adjustable inter-frequency frequency and at least one nonadjustable inter-frequency frequency.

The configuration information may include a preset signal quality threshold group, and the preset signal quality threshold group may include one or more thresholds.

S702: The terminal device receives the inter-frequency frequencies and the configuration information configured by the network device.

S703: The terminal device measures signal quality of the inter-frequency frequencies to obtain an inter-frequency measurement result, and measures signal quality of a serving cell on which the terminal device currently camps to obtain a serving cell measurement result.

S704: The terminal device determines, according to the inter-frequency measurement result and/or the serving cell measurement result and the configuration information, that frequency attribute information of a first inter-frequency frequency needs to be adjusted.

S705: The terminal device determines whether the first inter-frequency frequency is an adjustable inter-frequency frequency. If yes, perform S706; or if not, perform S707.

S706: Adjust measurement attribute information of the first inter-frequency frequency.

S707: Skip adjusting measurement attribute information of the first inter-frequency frequency.

In Embodiment 4, if the first inter-frequency frequency is an adjustable inter-frequency frequency configured by the network device, the terminal device may adjust the frequency attribute information of the first inter-frequency frequency according to the method for adjusting frequency attribute information in any foregoing embodiment. A detailed adjustment process has been described in the foregoing embodiment. Details are not described again herein.

Optionally, the adjustable inter-frequency frequencies configured by the network device may include a plurality of adjustable inter-frequency frequency groups, and each adjustable inter-frequency frequency group corresponds to respective N values, where N is a quantity of normal performance frequencies configured by the network device according to UE capability reported by the terminal device, and a sum of N values corresponding to all the adjustable inter-frequency frequency groups is less than or equal to a maximum measurement quantity M of the normal performance frequencies by the terminal device indicated by the UE capability.

Based on this, when determining N inter-frequency frequencies with the highest signal quality as normal performance frequencies, the terminal device may determine N inter-frequency frequencies with the highest signal quality in each adjustable inter-frequency frequency group as normal performance frequencies. For example, an N value corresponding to an adjustable inter-frequency frequency group A is 1, and an N value corresponding to an adjustable inter-frequency frequency group B is 2. The terminal device may determine one inter-frequency frequency with the highest signal quality in the adjustable inter-frequency frequency group A as a normal performance frequency and determine two inter-frequency frequencies with the highest signal quality in the adjustable inter-frequency frequency group B as normal performance frequencies.

Embodiment 5

Figure 8:
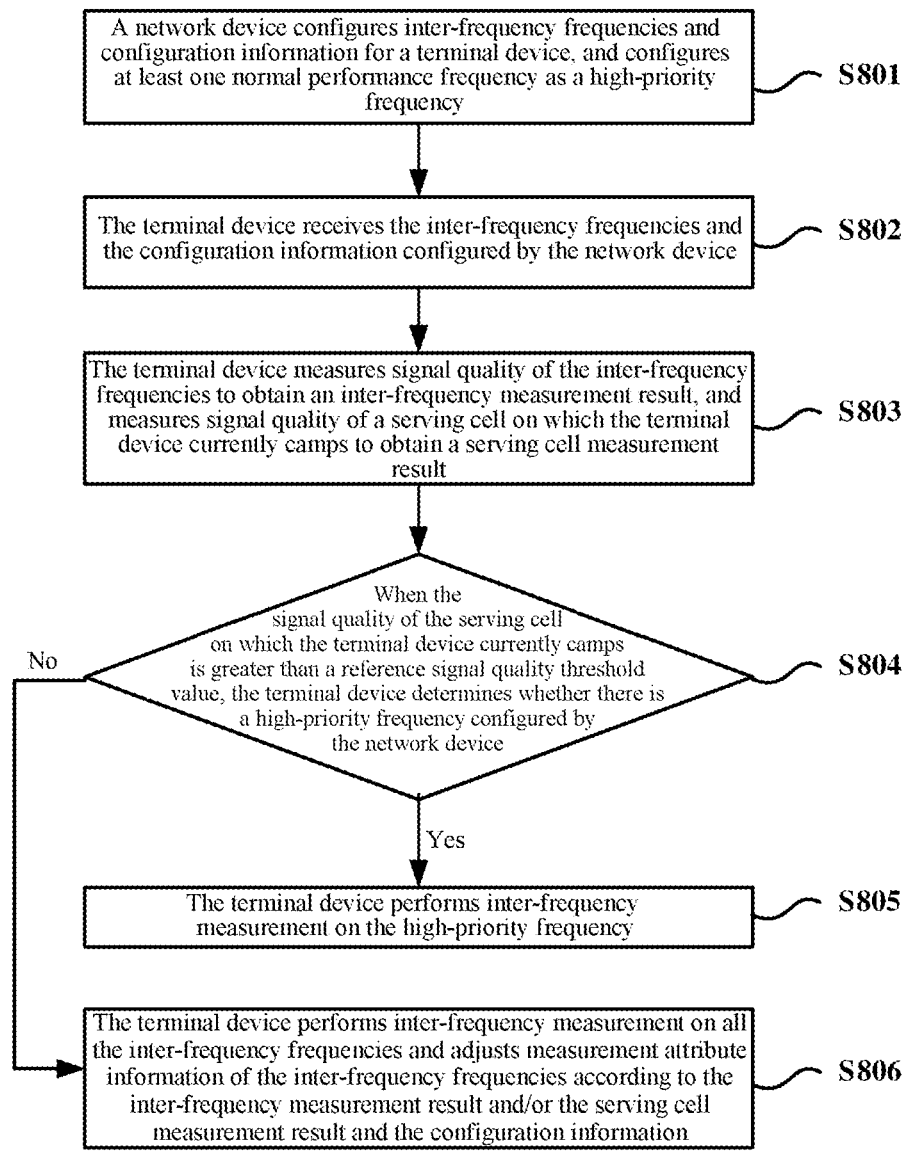
FIG. 8 is a schematic flowchart of a mobility measurement method in an RRC idle or inactive state according to still another embodiment of the present disclosure.

FIG. 8 is a schematic flowchart of a mobility measurement method in an RRC idle or inactive state according to still another embodiment of the present disclosure. The method in FIG. 8 is applicable to a terminal device and a network device and may include the following steps.

5801: The network device configures inter-frequency frequencies and configuration information for the terminal device, and configures at least one normal performance frequency as a high-priority frequency.

The inter-frequency frequencies include a normal performance frequency and a low performance frequency. The configuration information may include a preset signal quality threshold group, and the preset signal quality threshold group may include one or more thresholds.

In both the LTE protocol and the NR protocol, a frequency priority in an RRC idle or inactive state is defined. The frequency priority identifies a frequency at which UE preferentially camps in an RRC idle or inactive state. For a frequency with a priority higher than a priority of a frequency at which the UE currently camps, the UE needs to keep monitoring and performs switching after a reselection condition is met. For a frequency with a priority lower than a priority of a frequency at which the UE currently camps, the UE may perform monitoring only after signal quality of a serving cell on which the UE currently camps is less than a particular threshold. In addition, the high-priority frequencies are all normal performance frequencies.

S802: The terminal device receives the inter-frequency frequencies and the configuration information configured by the network device.

S803: The terminal device measures signal quality of the inter-frequency frequencies to obtain an inter-frequency measurement result, and measures signal quality of a serving cell on which the terminal device currently camps to obtain a serving cell measurement result.

S804: When the signal quality of the serving cell on which the terminal device currently camps is greater than a reference signal quality threshold value, the terminal device determines whether there is a high-priority frequency configured by the network device. If yes, perform S805; or if not, perform S806.

The reference signal quality threshold value includes an RSRP threshold value and/or an RSRQ threshold value.

S805: The terminal device performs inter-frequency measurement on the high-priority frequency.

S806: The terminal device performs inter-frequency measurement on all the inter-frequency frequencies and adjusts measurement attribute information of the inter-frequency frequencies according to the inter-frequency measurement result and/or the serving cell measurement result and the configuration information.

In Embodiment 5, the terminal device may adjust frequency attribute information of the inter-frequency frequencies according to the method for adjusting frequency attribute information in any foregoing embodiment. A detailed adjustment process has been described in the foregoing embodiments. Details are not described again herein.

Embodiment 6

Figure 9:
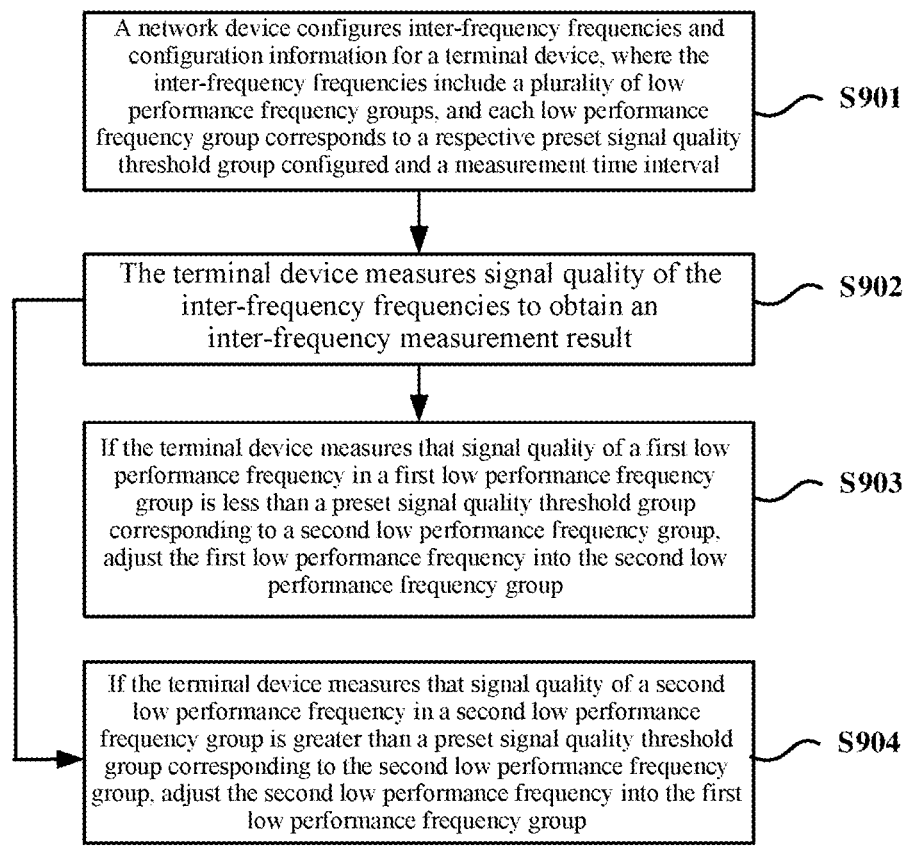
FIG. 9 is a schematic flowchart of a mobility measurement method in an RRC idle or inactive state according to still another embodiment of the present disclosure.

FIG. 9 is a schematic flowchart of a mobility measurement method in an RRC idle or inactive state according to still another embodiment of the present disclosure. In this embodiment, the measurement requirement is a measurement time interval of a low performance frequency. The method in FIG. 9 is applicable to a terminal device and a network device and may include the following steps.

S901: The network device configures inter-frequency frequencies and configuration information for the terminal device, where the inter-frequency frequencies include a plurality of low performance frequency groups, and each low performance frequency group corresponds to a respective preset signal quality threshold group configured and a measurement time interval.

It is assumed that in this embodiment, low performance frequencies are grouped into a first low performance frequency group and a second low performance frequency group, and a measurement requirement corresponding to a low performance frequency in the first low performance frequency group is higher than a measurement requirement corresponding to a low performance frequency in the second low performance frequency group. That is, the first low performance frequency group is discussed with respect to the second low performance frequency group, and is a low performance frequency group with relatively high measurement requirements. The second low performance frequency group is discussed with respect to the first low performance frequency group, and is a low performance frequency group with relatively low measurement requirements.

S902: The terminal device measures signal quality of the inter-frequency frequencies to obtain an inter-frequency measurement result.

S903: If the terminal device measures that signal quality of a first low performance frequency in a first low performance frequency group is less than a preset signal quality threshold group corresponding to a second low performance frequency group, adjust the first low performance frequency into the second low performance frequency group.

S904: If the terminal device measures that signal quality of a second low performance frequency in a second low performance frequency group is greater than a preset signal quality threshold group corresponding to the second low performance frequency group, adjust the second low performance frequency into the first low performance frequency group.

In Embodiment 6, a preset signal quality threshold group corresponding to each low performance frequency group may include one preset signal quality threshold, or may include a plurality of preset signal quality thresholds. For example, if a condition of adjusting the first low performance frequency into the second low performance frequency group is that signal quality of a first performance frequency remains less than a threshold L_7, the preset signal quality threshold group corresponding to the second low performance frequency group only includes the threshold L_7. In another example, if a condition of adjusting the first low performance frequency into the second low performance frequency group is that signal quality of the first performance frequency is less than the threshold L_7, and signal quality of a serving cell on which UE currently camps is greater than a threshold L_f4, the preset signal quality threshold group corresponding to the second low performance frequency group includes the threshold L_7, the threshold L_f4, and the like.

In Embodiment 6, according to a relationship between signal quality of a low performance frequency and a preset signal quality threshold group, the low performance frequency is adjusted between low performance frequency groups. Because the low performance frequency groups correspond to different measurement time intervals, the adjustment of the measurement time interval of the low performance frequency is implemented.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

Figure 10:
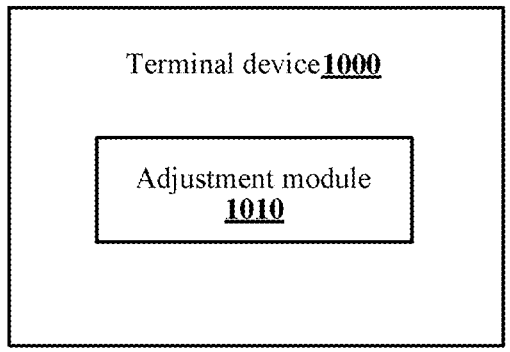
FIG. 10 is a schematic structural diagram of a terminal device according to an embodiment of the present disclosure.

FIG. 10 is a schematic structural diagram of a terminal device according to an embodiment of the present disclosure. Referring to FIG. 10, a terminal device 1000 may include: an adjustment module 1010, configured to adjust measurement attribute information of inter-frequency frequencies, according to an inter-frequency measurement result and/or a serving cell measurement result of the terminal device and configuration information from a network device, where the measurement attribute information of the inter-frequency frequencies includes at least one of: a frequency type, a quantity of frequencies of different frequency types, or a measurement requirement of frequencies of different frequency types), the frequency type includes a first performance frequency or a second performance frequency, and a measurement requirement of the second performance frequency is lower than a measurement requirement of the first performance frequency.

In an embodiment, the adjustment module 1010 is further configured to: within a first duration, if the first performance frequency meets the following condition, adjust the first performance frequency to the second performance frequency, where signal quality of the first performance frequency remains less than a first threshold; or, signal quality of the first performance frequency remains less than a first threshold, and signal quality of a serving cell remains greater than a second threshold; or, signal quality of the first performance frequency remains less than a first threshold, and signal quality fluctuation of a serving cell remains less than a second threshold; or, a difference between signal quality of the first performance frequency and signal quality of a serving cell remains greater than a third threshold; or, a difference between signal quality of the first performance frequency and signal quality of a serving cell remains greater than a third threshold, and the signal quality of the serving cell remains greater than a second threshold; or, a difference between signal quality of the first performance frequency and signal quality of a serving cell remains greater than a third threshold, and signal quality fluctuation of the serving cell remains less than a second threshold; or, signal quality of the first performance frequency remains greater than a first threshold, and a difference between the signal quality of the first performance frequency and signal quality of a first performance frequency with the highest signal quality in the inter-frequency measurement result remains greater than a fourth threshold; and the first threshold, the second threshold, the third threshold, and the fourth threshold are included in a preset signal quality threshold group configured by the network device.

In an embodiment, the adjustment module 1010 is further configured to: within a second duration, if the second performance frequency meets the following condition, adjust the second performance frequency to the first performance frequency, where signal quality of the second performance frequency remains greater than a fifth threshold; or, a difference between signal quality of the second performance frequency and the signal quality of the serving cell remains less than a sixth threshold; or, signal quality of the second performance frequency remains less than a fifth threshold, and the difference between the signal quality of the first performance frequency and the signal quality of the first performance frequency with the highest signal quality in the inter-frequency measurement result remains less than a seventh threshold; or, signal quality of the second performance frequency remains less than a fifth threshold, and the signal quality of the serving cell remains less than a tenth threshold; or, signal quality of the second performance frequency remains less than a fifth threshold, and the signal quality fluctuation of the serving cell remains greater than a tenth threshold.

In an embodiment, the adjustment module 1010 is further configured to: within a third duration, if signal quality of a serving cell remains greater than an eighth threshold, determine N inter-frequency frequencies with the highest signal quality as the first performance frequencies, where N is an integer greater than or equal to 1 and is configured by the network device; and the eighth threshold is included in a preset signal quality threshold group configured by the network device.

In an embodiment, the terminal device 1000 further includes: a reporting module, configured to: before the measurement attribute information of the inter-frequency frequencies are adjusted according to the inter-frequency measurement result and/or the serving cell measurement result of the terminal device and the configuration information from the network device, report a UE capability to the network device, where the UE capability is used for indicating a maximum measurement quantity M of the first performance frequencies by the terminal device.

In an embodiment, the adjustment module 1010 is further configured to: if there are unmeasured frequencies, determine N inter-frequency frequencies with the highest signal quality in a measured frequency group as the first performance frequencies; or, mark unmeasured frequencies as the first performance frequencies, perform measurement on the unmeasured frequencies to obtain an inter-frequency measurement result corresponding to the unmeasured frequencies, update the unmeasured frequencies as measured frequencies, and determine N inter-frequency frequencies with the highest signal quality in an updated measured frequency group as the first performance frequencies.

In an embodiment, the adjustment module 1010 is further configured to determine N inter-frequency frequencies with the highest signal quality corresponding to an end moment of the third duration as the first performance frequencies.

In an embodiment, the adjustment module 1010 is further configured to: within a fourth duration, if signal quality of a serving cell remains less than a ninth threshold, configure all the inter-frequency frequencies as the first performance frequencies; and the ninth threshold is included in a preset signal quality threshold group configured by the network device.

In an embodiment, the inter-frequency frequencies are preconfigured by the network device as adjustable inter-frequency frequencies and nonadjustable inter-frequency frequencies; and the adjustment module 1010 is further configured to adjust the measurement attribute information of the adjustable inter-frequency frequencies.

In an embodiment, the inter-frequency frequencies include a plurality of adjustable inter-frequency frequency groups preconfigured by the network device, and each adjustable inter-frequency frequency group corresponds to respective N values; and the adjustment module is further configured to determine N inter-frequency frequencies with the highest signal quality in each adjustable inter-frequency frequency group as the first performance frequencies.

In an embodiment, the terminal device 1000 further includes: a determining module, configured to: before the measurement attribute information of the inter-frequency frequencies are adjusted according to the inter-frequency measurement result and/or the serving cell measurement result of the terminal device and the configuration information from the network device, determine that there is a high-priority frequency configured by the network device, where the high-priority frequency is the first performance frequency; and a measurement module, configured to: when signal quality of a serving cell is greater than a reference signal quality threshold value, measure signal quality of only the high-priority frequency, where the reference signal quality threshold value includes an RSRP threshold value and/or an RSRQ threshold value.

In an embodiment, the inter-frequency frequencies include a plurality of second performance frequency groups, and each second performance frequency group corresponds to a respective preset signal quality threshold group and the measurement requirement; and the adjustment module 1010 is further configured to: if signal quality of a second performance frequency in a second performance frequency group with relatively high measurement requirements is less than that in a preset signal quality threshold group corresponding to a second performance frequency group with relatively low measurement requirements, adjust the second performance frequency into the second performance frequency group with relatively low measurement requirements; and if signal quality of a second performance frequency in the second performance frequency group with relatively low measurement requirements is greater than that in a preset signal quality threshold group corresponding to a second performance frequency group with relatively low measurement requirements, adjust the second performance frequency into the second performance frequency group with relatively high measurement requirements.

In an embodiment, the measurement requirement includes at least one of a measurement time interval or a measurement sampling point quantity.

The terminal device provided in the embodiments of the present disclosure can implement various processes implemented by the terminal device in the foregoing method embodiments. To avoid repetition, details are not described herein again.

In the embodiments of the present disclosure, a first performance frequency and a second performance frequency with different measurement requirements are introduced, and measurement attribute information (including at least one of: a quantity of frequencies of different frequency types, a frequency type, or a measurement requirement of frequencies of different frequency types) of inter-frequency frequencies is adjusted according to an inter-frequency measurement result and/or a serving cell measurement result of a terminal device and configuration information from a network device, to implement the controllability of the behavior of the terminal device and dynamically adjust inter-frequency frequencies, so that when detecting inter-frequency frequencies, the terminal device can reduce unnecessary radio resource management measurement, thereby reducing the power consumption of UE.

Figure 11:
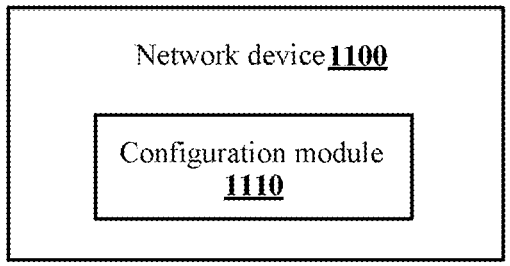
FIG. 11 is a schematic structural diagram of a network device according to an embodiment of the present disclosure.

FIG. 11 is a schematic structural diagram of a network device according to an embodiment of the present disclosure. Referring to FIG. 11, a network device 1100 may include: a configuration module 1110, configured to configure inter-frequency frequencies and configuration information for a terminal device, where the terminal device is configured to adjust measurement attribute information of the inter-frequency frequencies according to an inter-frequency measurement result and/or a serving cell measurement result and the configuration information, where the measurement attribute information of the inter-frequency frequencies includes at least one of: a frequency type, a quantity of different frequencies, or a measurement requirement of frequencies of different frequency types, the frequency type includes a first performance frequency or a second performance frequency, and a measurement requirement of the second performance frequency is lower than a measurement requirement of the first performance frequency.

In an embodiment, the network device 1100 further includes: a receiving module, configured to: before the inter-frequency frequencies and the configuration information are configured for the terminal device, receive a UE capability reported by the terminal device, where the UE capability is used for indicating a maximum measurement quantity M of the first performance frequencies by the terminal device, where the configuration module 1110 is further configured to configure an N value less than or equal to the maximum measurement quantity M according to the UE capability, where the N value is a quantity of first performance frequencies to be adjusted by the terminal device.

In an embodiment, the configuration module 1110 is further configured to: configure at least one of the inter-frequency frequencies as an adjustable inter-frequency frequency; and configure at least one of the inter-frequency frequencies as a nonadjustable inter-frequency frequency.

In an embodiment, the configuration module is further configured to: configure a plurality of adjustable inter-frequency frequency groups; and configure a respective N value for each adjustable inter-frequency frequency group.

In an embodiment, the configuration module 1110 is further configured to configure at least one first performance frequency as a high-priority frequency.

In an embodiment, the configuration module 1110 is further configured to configure a plurality of second performance frequency groups, where each second performance frequency group corresponds to a respective preset signal quality threshold group and the measurement requirement.

In an embodiment, the configuration module is further configured to configure a preset signal quality threshold group, where the preset signal quality threshold group includes at least one threshold.

In the embodiments of the present disclosure, a first performance frequency and a second performance frequency with different measurement requirements are introduced, and measurement attribute information (including at least one of: a quantity of frequencies of different frequency types, a frequency type, or a measurement requirement of frequencies of different frequency types) of inter-frequency frequencies is adjusted according to an inter-frequency measurement result and/or a serving cell measurement result of a terminal device and configuration information from a network device, to implement the controllability of the behavior of the terminal device and dynamically adjust inter-frequency frequencies, so that when detecting inter-frequency frequencies, the terminal device can reduce unnecessary radio resource management measurement, thereby reducing the power consumption of UE.

Figure 12:
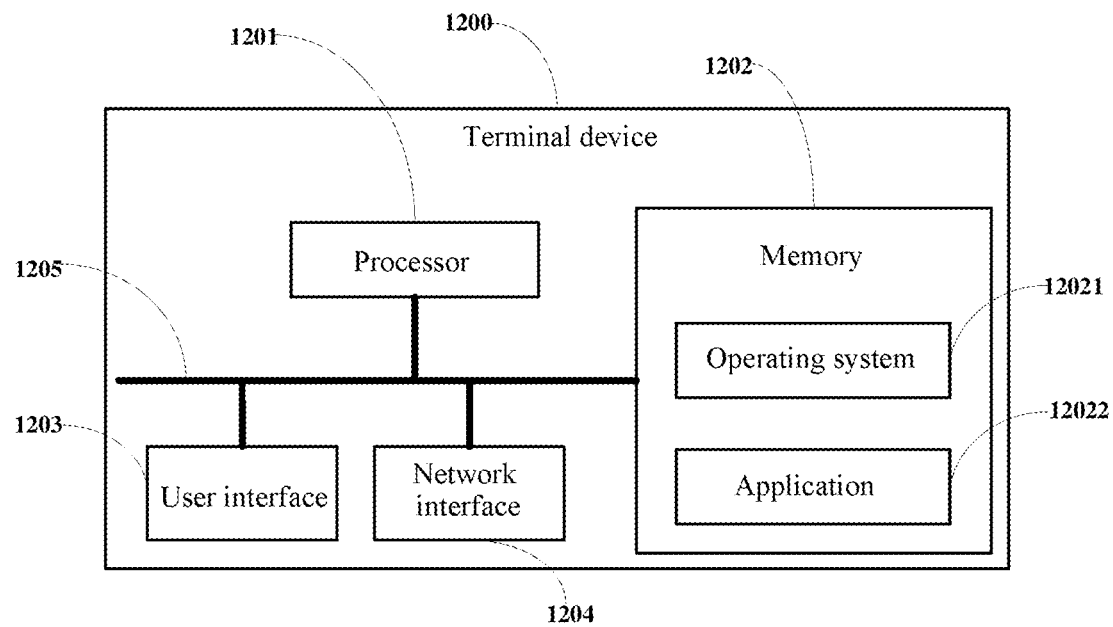
FIG. 12 is a schematic structural diagram of a terminal device according to an embodiment of the present disclosure.

FIG. 12 is a block diagram of a terminal device according to another embodiment of the present disclosure. A terminal device 1200 shown in FIG. 12 includes at least one processor 1201, a memory 1202, at least one network interface 1204, and a user interface 1203. All the components in the terminal device 1200 are coupled together by using a bus system 1205. It may be understood that the bus system 1205 is configured to implement connection and communication between the components. In addition to a data bus, the bus system 1205 further includes a power bus, a control bus, and a status signal bus. However, for ease of clear description, all types of buses are marked as the bus system 1205 in FIG. 12.

The user interface 1203 may include a display, a keyboard or a clicking device (for example, a mouse), a trackball, a touch panel or a touchscreen, and the like.

It may be understood that, the memory 1202 in this embodiment of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), used as an external cache. By way of example but not limitative description, many forms of RAMs may be used, for example, a static random access memory (Static RAM, SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). The memory 1202 in the system and method described in the embodiments of the present disclosure includes, but is not limited to, these memories and any other suitable types.

In some implementations, the memory 1202 stores the following element, executable module, or data structure, or a subset thereof, or an extension set thereof: an operating system 12021 and an application 12022.

The operating system 12021 includes various system programs, for example, a frame layer, a core library layer, and a drive layer, used for implementing various basic services and processing tasks based on hardware. The application 12022 includes various applications, for example, a media player and a browser, used for implementing various application services. A program for implementing the method of the embodiments of the present disclosure may be included in the application 12022.

In the embodiments of the present disclosure, the terminal device 1200 further includes a computer program stored in the memory 1202 and capable of being run on the processor 1201. The computer program, when being executed by the processor 1201, implements the following steps: adjusting measurement attribute information of inter-frequency frequencies, according to an inter-frequency measurement result and/or a serving cell measurement result of the terminal device and configuration information from a network device, where the inter-frequency frequencies are configured by the network device, the measurement attribute information of the inter-frequency frequencies includes at least one of: a frequency type, a quantity of frequencies of different frequency types, or a measurement requirement of frequencies of different frequency types, the frequency type includes a first performance frequency or a second performance frequency, and a measurement requirement of the second performance frequency is lower than a measurement requirement of the first performance frequency.

The method disclosed in the foregoing embodiments of the present disclosure may be applied to the processor 1201, or implemented by the processor 1201. The processor 1201 may be an integrated circuit chip having a signal processing capability. In an implementation process, steps in the foregoing methods can be implemented by using a hardware integrated logical circuit in the processor 1201, or by using instructions in a form of software. The foregoing processor 1201 may be a general-purpose processor, a digital signal processor (DSP), an application-specific integrated circuit (ASIC), a field-programmable gate array (FPGA), or another programmable logic device (PLD), discrete gate or transistor logic device, or discrete hardware component, may implement or perform the methods, the steps, and logic block diagrams that are disclosed in the embodiments of the present disclosure. The general-purpose processor may be a microprocessor, or the processor may be any conventional processor or the like. The steps of the methods disclosed with reference to the embodiments of the present disclosure may be directly performed and completed by using a hardware decoding processor, or may be performed and completed by using a combination of hardware and software modules in the decoding processor. The software module may be stored in a computer-readable storage medium that is mature in the art, such as a RAM, a flash memory, a ROM, a RROM, an electrically erasable programmable memory or a register. The computer-readable storage medium is located in the memory 1202, and the processor 1201 reads information in the memory 1202, and completes the steps in the foregoing methods in combination with hardware thereof. Specifically, a computer-readable storage medium stores a computer program. The computer program, when being executed by the processor 1201, implements, for example, the steps of the foregoing embodiments of the mobility measurement method in an RRC idle or inactive state.

It may be understood that the embodiments described in the embodiments of the present disclosure may be implemented by hardware, software, firmware, middleware, microcode, or a combination thereof. For hardware implementation, a processing unit may be implemented in one or more ASICs, a DSP, a DSP device (DSPD), a PLD, an FPGA, a general-purpose processor, a controller, a microcontroller, a microprocessor, and other electronic units configured to execute the functions in the present disclosure, or a combination of the above.

For implementation by software, the technologies in the embodiments may be implemented by performing the functional modules (for example, a process and a function) in the embodiments of the present disclosure. Software code may be stored in a memory and executed by a processor. The memory may be implemented in the processor or outside the processor.

Optionally, the computer program, when being executed by the processor 1201, may further implement the following step: within a first duration, if the first performance frequency meets the following condition, adjusting the first performance frequency to the second performance frequency, where signal quality of the first performance frequency remains less than a first threshold; or, signal quality of the first performance frequency remains less than a first threshold, and signal quality of a serving cell remains greater than a second threshold; or, signal quality of the first performance frequency remains less than a first threshold, and signal quality fluctuation of a serving cell remains less than a second threshold; or, a difference between signal quality of the first performance frequency and signal quality of a serving cell remains greater than a third threshold; or, a difference between signal quality of the first performance frequency and signal quality of a serving cell remains greater than a third threshold, and the signal quality of the serving cell remains greater than a second threshold; or, a difference between signal quality of the first performance frequency and signal quality of a serving cell remains greater than a third threshold, and signal quality fluctuation of the serving cell remains less than a second threshold; or, signal quality of the first performance frequency remains greater than a first threshold, and a difference between the signal quality of the first performance frequency and signal quality of a first performance frequency with the highest signal quality in the inter-frequency measurement result remains greater than a fourth threshold; and the first threshold, the second threshold, the third threshold, and the fourth threshold are included in a preset signal quality threshold group configured by the network device.

Optionally, the computer program, when being executed by the processor 1201, may further implement the following step: within a second duration, if the second performance frequency meets the following condition, adjusting the second performance frequency to the first performance frequency, where signal quality of the second performance frequency remains greater than a fifth threshold; or, a difference between signal quality of the second performance frequency and the signal quality of the serving cell remains less than a sixth threshold; or, signal quality of the second performance frequency remains less than a fifth threshold, and the difference between the signal quality of the first performance frequency and the signal quality of the first performance frequency with the highest signal quality in the inter-frequency measurement result remains less than a seventh threshold; or, signal quality of the second performance frequency remains less than a fifth threshold, and the signal quality of the serving cell remains less than a tenth threshold; or, signal quality of the second performance frequency remains less than a fifth threshold, and the signal quality fluctuation of the serving cell remains greater than a tenth threshold; and the fifth threshold, the sixth threshold, the seventh threshold, and the tenth threshold are included in the preset signal quality threshold group configured by the network device.

Optionally, the computer program, when being executed by the processor 1201, may further implement the following step: within a third duration, if signal quality of a serving cell remains greater than an eighth threshold, determining N inter-frequency frequencies with the highest signal quality as the first performance frequencies, where N is an integer greater than or equal to 1 and is configured by the network device; and the eighth threshold is included in a preset signal quality threshold group configured by the network device.

Optionally, the computer program, when being executed by the processor 1201, may further implement the following step: before the adjusting measurement attribute information of inter-frequency frequencies, according to the inter-frequency measurement result and/or the serving cell measurement result of the terminal device and configuration information from the network device, reporting a UE capability to the network device, where the UE capability is used for indicating a maximum measurement quantity M of the first performance frequencies by the terminal device, and N is an integer less than or equal to M.

Optionally, the computer program, when being executed by the processor 1201, may further implement the following steps: determining N inter-frequency frequencies with the highest signal quality in a measured frequency group as the first performance frequencies if there are unmeasured frequencies; or, marking unmeasured frequencies as the first performance frequencies, performing measurement on the unmeasured frequencies to obtain an inter-frequency measurement result corresponding to the unmeasured frequencies, updating the unmeasured frequencies as measured frequencies, and determining N inter-frequency frequencies with the highest signal quality in an updated measured frequency group as the first performance frequencies.

Optionally, the computer program, when being executed by the processor 1201, may further implement the following step: determining N inter-frequency frequencies with the highest signal quality corresponding to an end moment of the third duration as the first performance frequencies.

Optionally, the computer program, when being executed by the processor 1201, may further implement the following step: within a fourth duration, if signal quality of a serving cell remains less than a ninth threshold, configuring all the inter-frequency frequencies as the first performance frequencies; and the ninth threshold is included in a preset signal quality threshold group configured by the network device.

Optionally, the inter-frequency frequencies are preconfigured by the network device as adjustable inter-frequency frequencies and nonadjustable inter-frequency frequencies; and the computer program, when being executed by the processor 1201, may further implement the following step: adjusting the measurement attribute information of the adjustable inter-frequency frequencies.

Optionally, the inter-frequency frequencies include a plurality of adjustable inter-frequency frequency groups preconfigured by the network device, and each adjustable inter-frequency frequency group corresponds to respective N values; and the computer program, when being executed by the processor 1201, may further implement the following step: determining N inter-frequency frequencies with the highest signal quality in each adjustable inter-frequency frequency group as the first performance frequencies.

Optionally, the computer program, when being executed by the processor 1201, may further implement the following steps: before the adjusting measurement attribute information of inter-frequency frequencies according to the inter-frequency measurement result and/or the serving cell measurement result of the terminal device, determining that that there is a high-priority frequency configured by the network device, where the high-priority frequency is the first performance frequency; and when signal quality of a serving cell is greater than a reference signal quality threshold value, measuring signal quality of only the high-priority frequency, where the reference signal quality threshold value includes an RSRP threshold value and/or an RSRQ threshold value.

Optionally, the inter-frequency frequencies include a plurality of second performance frequency groups, and each second performance frequency group corresponds to a respective preset signal quality threshold group and the measurement requirement; and the computer program, when being executed by the processor 1201, may further implement the following steps: if signal quality of a second performance frequency in a second performance frequency group with relatively high measurement requirements is less than that in a preset signal quality threshold group corresponding to a second performance frequency group with relatively low measurement requirements, adjusting the second performance frequency into the second performance frequency group with relatively low measurement requirements; and if signal quality of a second performance frequency in the second performance frequency group with relatively low measurement requirements is greater than that in a preset signal quality threshold group corresponding to a second performance frequency group with relatively low measurement requirements, adjusting the second performance frequency into the second performance frequency group with relatively high measurement requirements. Optionally, the measurement requirement includes at least one of a measurement time interval or a measurement sampling point quantity.

The terminal device 1200 can implement various processes and effects implemented by the terminal device in the foregoing embodiments. To avoid repetition, details are not described herein again.

In the embodiments of the present disclosure, a first performance frequency and a second performance frequency with different measurement requirements are introduced, and measurement attribute information (including at least one of: a quantity of frequencies of different frequency types, a frequency type, or a measurement requirement of frequencies of different frequency types) of inter-frequency frequencies is adjusted according to an inter-frequency measurement result and/or a serving cell measurement result of a terminal device and configuration information from a network device, to implement the controllability of the behavior of the terminal device and dynamically adjust inter-frequency frequencies, so that when detecting inter-frequency frequencies, the terminal device can reduce unnecessary radio resource management measurement, thereby reducing the power consumption of UE.

Figure 13:
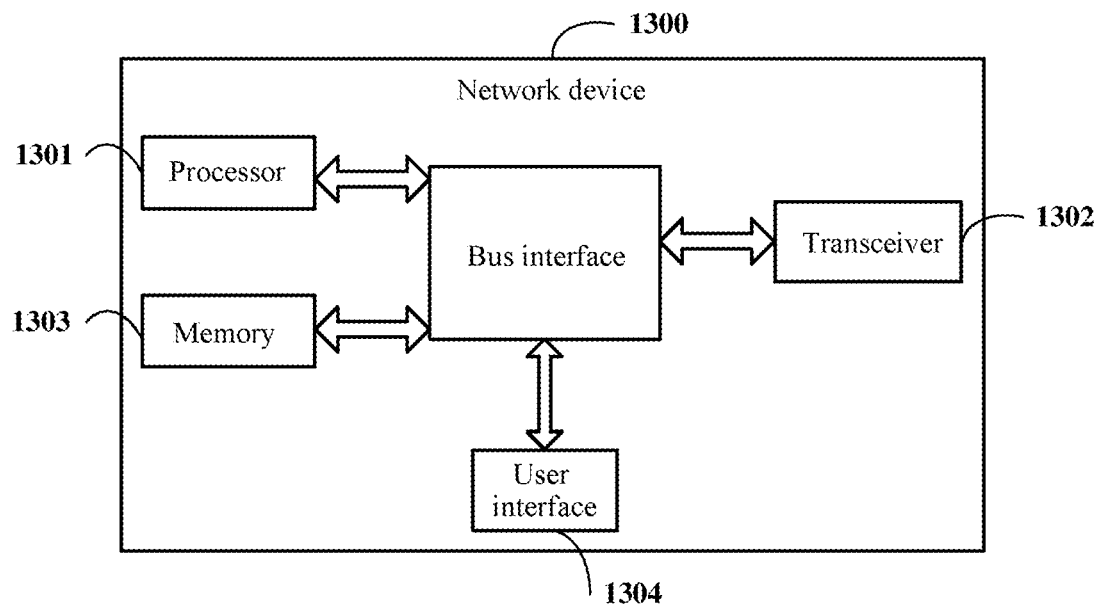
FIG. 13 is a schematic structural diagram of a network device according to an embodiment of the present disclosure.

FIG. 13 is a structural diagram of a network device to which the embodiment of the present disclosure is applied, and can implement details of the mobility measurement method in an RRC idle or inactive state performed by the network device in the foregoing embodiments and achieve the same effects. As shown in FIG. 13, a network device 1300 includes a processor 1301, a transceiver 1302, a memory 1303, a user interface 1304, and a bus interface. In the embodiments of the present disclosure, the network device 1300 further includes a computer program stored in the memory 1303 and capable of being run on the processor 1301. The computer program, when being executed by the processor 1301, implements the following steps: configuring inter-frequency frequencies and configuration information for a terminal device, where the terminal device is configured to adjust measurement attribute information of the inter-frequency frequencies according to an inter-frequency measurement result and/or a serving cell measurement result and the configuration information, where the measurement attribute information of the inter-frequency frequencies includes at least one of: a frequency type, a quantity of different frequencies, or a measurement requirement of frequencies of different frequency types, the frequency type includes a first performance frequency or a second performance frequency; and a measurement requirements of the second performance frequency is lower than a measurement requirement of the first performance frequency.

In FIG. 13, a bus architecture may include any quantity of interconnected buses and bridges, and specifically connects various circuits that are of one or more processors represented by the processor 1301 and of a memory represented by the memory 1303. The bus architecture may further connect various other circuits of a peripheral, a voltage regulator, a power management circuit, and the like. This is well known in the art, and therefore, no further description is provided in this specification. The bus interface provides an interface. The transceiver 1302 may be a plurality of components, including a transmitter and a receiver, and providing units for communicating with various other apparatuses on a transmission medium. For different UEs, the user interface 1304 may be an interface capable of externally or internally connecting a required device, the connected device includes, but not limited to, a keypad, a display, a speaker, a microphone, and a joystick.

The processor 1301 is responsible for the management of the bus architecture and normal processing, and the memory 1303 may store data used when the processor 1301 performs an operation.

Optionally, the computer program, when being executed by the processor 1301, may further implement the following steps: before the configuring inter-frequency frequencies and the configuration information for a terminal device, receiving a UE capability reported by the terminal device, where the UE capability is used for indicating a maximum measurement quantity M of the first performance frequencies by the terminal device; and configuring an N value less than or equal to the maximum measurement quantity M according to the UE capability, where the N value is a quantity of first performance frequencies to be adjusted by the terminal device.

Optionally, the computer program, when being executed by the processor 1301, may further implement the following steps: configuring at least one of the inter-frequency frequencies as an adjustable inter-frequency frequency; and configuring at least one of the inter-frequency frequencies as a nonadjustable inter-frequency frequency.

Optionally, the computer program, when being executed by the processor 1301, may further implement the following steps: configuring a plurality of adjustable inter-frequency frequency groups; and configuring a respective N value for each adjustable inter-frequency frequency group.

Optionally, the computer program, when being executed by the processor 1301, may further implement the following step: configuring at least one first performance frequency as a high-priority frequency.

Optionally, the measurement requirement includes a measurement time interval; and the computer program, when being executed by the processor 1301, may further implement the following step: configuring a plurality of second performance frequency groups, where each second performance frequency group corresponds to a respective preset signal quality threshold group and the measurement requirement.

Optionally, a preset signal quality threshold group is configured, where the preset signal quality threshold group includes at least one threshold.

In the embodiments of the present disclosure, a first performance frequency and a second performance frequency with different measurement requirements are introduced, and measurement attribute information (including at least one of: a quantity of frequencies of different frequency types, a frequency type, or a measurement requirement of frequencies of different frequency types) of inter-frequency frequencies is adjusted according to an inter-frequency measurement result and/or a serving cell measurement result of a terminal device and configuration information from a network device, to implement the controllability of the behavior of the terminal device and dynamically adjust inter-frequency frequencies, so that when detecting inter-frequency frequencies, the terminal device can reduce unnecessary radio resource management measurement, thereby reducing the power consumption of UE.

Optionally, an embodiment of the present disclosure further provides a terminal device, including a processor, a memory, and a computer program stored in the memory and capable of being run on the processor, where the computer program, when being executed by the processor, implements various processes of the embodiments of the foregoing mobility measurement method in an RRC idle or inactive state, and can achieve the same technical effects. To avoid repetition, details are not described herein again.

Optionally, an embodiment of the present disclosure further provides a network device, including a processor, a memory, and a computer program stored in the memory and capable of being run on the processor, where the computer program, when being executed by the processor, implements various processes of the embodiments of the foregoing mobility measurement method in an RRC idle or inactive state, and can achieve the same technical effects. To avoid repetition, details are not described herein again.

An embodiment of the present disclosure further provides a computer-readable storage medium, storing a computer program, where the computer program, when executed by a processor, implements various processes of the embodiments of the foregoing mobility measurement method in an RRC idle or inactive state and can achieve the same technical effects. To avoid repetition, details are not described herein again. The computer-readable storage medium is, for example, a ROM, a RAM, a magnetic disk, an optical disc or the like.

It should be noted that the term "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of the present disclosure.

The embodiments of the present disclosure have been described above with reference to the accompanying drawings. The present disclosure is not limited to the specific embodiments described above, and the specific embodiments described above are merely exemplary and not limitative. Those of ordinary skill in the art may make various variations under the teaching of the present disclosure without departing from the spirit of the present disclosure and the protection scope of the claims, and such variations shall all fall within the protection scope of the present disclosure.

What is claimed is:

1. A mobility measurement method in a radio resource control (RRC) idle or inactive state, applicable to a terminal device, the method comprising:

receiving inter-frequency frequencies and configuration information configured by a network device, wherein the inter-frequency frequencies comprise at least one adjustable inter-frequency frequency and at least one nonadjustable inter-frequency frequency, adjusting measurement attribute information of an adjustable inter-frequency frequency of the inter-frequency frequencies, according to a serving cell measurement result of the terminal device and configuration information from a network device, wherein the measurement attribute information of the inter-frequency frequencies comprises a measurement requirement of frequencies of different frequency types, the different frequency types comprise a first performance frequency or a second performance frequency, and a measurement requirement of the second performance frequency is lower than a measurement requirement of the first performance frequency, and skipping adjusting measurement attribute information of the at least one non-adjustable inter-frequency frequency of the inter-frequency frequencies according to the inter-frequency frequencies and configuration information configured by the network device.

2. The method according to claim 1, wherein the adjusting measurement attribute information of inter-frequency frequencies, according to a serving cell measurement result of the terminal device and configuration information from a network device comprises:

within a first duration, if the first performance frequency meets the following condition, adjusting the first performance frequency to the second performance frequency, wherein signal quality of the first performance frequency remains less than a first threshold; or signal quality of the first performance frequency remains less than a first threshold, and signal quality of a serving cell remains greater than a second threshold; or signal quality of the first performance frequency remains less than a first threshold, and signal quality fluctuation of a serving cell remains less than a second threshold; or a difference between signal quality of the first performance frequency and signal quality of a serving cell remains greater than a third threshold; or a difference between signal quality of the first performance frequency and signal quality of a serving cell remains greater than a third threshold, and the signal quality of the serving cell remains greater than a second threshold; or a difference between signal quality of the first performance frequency and signal quality of a serving cell remains greater than a third threshold, and signal quality fluctuation of the serving cell remains less than a second threshold;

wherein the first threshold, the second threshold, and the third threshold are comprised in a preset signal quality threshold group configured by the network device.

3. The method according to claim 1, wherein the adjusting measurement attribute information of inter-frequency frequencies, according to a serving cell measurement result of the terminal device and configuration information from a network device comprises:

within a second duration, if the second performance frequency meets the following condition, adjusting the second performance frequency to the first performance frequency, wherein signal quality of the second performance frequency remains greater than a fifth threshold; or a difference between signal quality of the second performance frequency and the signal quality of the serving cell remains less than a sixth threshold;

signal quality of the second performance frequency remains less than a fifth threshold, and the signal quality of the serving cell remains less than a tenth threshold; or signal quality of the second performance frequency remains less than a fifth threshold, and the signal quality fluctuation of the serving cell remains greater than a tenth threshold, wherein the fifth threshold, the sixth threshold, and the tenth threshold are comprised in the preset signal quality threshold group configured by the network device.

4. The method according to claim 3, before the adjusting measurement attribute information of inter-frequency frequencies, according to a serving cell measurement result of the terminal device and configuration information from a network device, further comprising:

reporting a user equipment (UE) capability to the network device, wherein the UE capability is used for indicating a maximum measurement quantity M of the first performance frequencies by the terminal device, and N is an integer less than or equal to M.

5. The method according to claim 3, wherein the determining N inter-frequency frequencies with the highest signal quality as the first performance frequencies comprises:

determining N inter-frequency frequencies with the highest signal quality in a measured frequency group as the first performance frequencies; or if there are unmeasured frequencies, marking unmeasured frequencies as the first performance frequencies, performing measurement on the unmeasured frequencies to obtain an inter-frequency measurement result corresponding to the unmeasured frequencies, updating the unmeasured frequencies as measured frequencies, and determining N inter-frequency frequencies with the highest signal quality in an updated measured frequency group as the first performance frequencies; or, determining N inter-frequency frequencies with the highest signal quality corresponding to an end moment of the third duration as the first performance frequencies.

6. The method according to claim 1, wherein the adjusting measurement attribute information of inter-frequency frequencies, according to a serving cell measurement result of the terminal device and configuration information from a network device comprises:

within a third duration, if signal quality of a serving cell remains greater than an eighth threshold, determining N inter-frequency frequencies with the highest signal quality as the first performance frequencies, wherein N is an integer greater than or equal to 1 and is configured by the network device, wherein the eighth threshold is comprised in a preset signal quality threshold group configured by the network device; or within a fourth duration, if signal quality of a serving cell remains less than a ninth threshold, configuring all the inter-frequency frequencies as the first performance frequencies, wherein the ninth threshold is comprised in a preset signal quality threshold group configured by the network device.

7. The method according to claim 3, wherein the inter-frequency frequencies comprise a plurality of adjustable inter-frequency frequency groups preconfigured by the network device, and each adjustable inter-frequency frequency group corresponds to respective N values; and the determining N inter-frequency frequencies with the highest signal quality as the first performance frequencies comprises:

determining N inter-frequency frequencies with the highest signal quality in each adjustable inter-frequency frequency group as the first performance frequencies.

8. The method according to claim 1, wherein before the adjusting measurement attribute information of inter-frequency frequencies, according to a serving cell measurement result of the terminal device and configuration information from a network device, further comprising:

determining that there is a high-priority frequency configured by the network device, wherein the high-priority frequency is the first performance frequency; and when signal quality of a serving cell is greater than a reference signal quality threshold value, measuring signal quality of only the high-priority frequency, wherein the reference signal quality threshold value comprises a reference signal received power (RSRP) threshold value and/or a reference signal received quality (RSRQ) threshold value.

9. The method according to claim 1, wherein the inter-frequency frequencies comprise a plurality of second performance frequency groups, and each second performance frequency group corresponds to a respective preset signal quality threshold group and the measurement requirement; and the adjusting measurement attribute information of inter-frequency frequencies, according to a serving cell measurement result of the terminal device and configuration information from a network device comprises:

if signal quality of a second performance frequency in a second performance frequency group with relatively high measurement requirements is less than that in a preset signal quality threshold group corresponding to a second performance frequency group with relatively low measurement requirements, adjusting the second performance frequency into the second performance frequency group with relatively low measurement requirements; and if signal quality of a second performance frequency in the second performance frequency group with relatively low measurement requirements is greater than that in a preset signal quality threshold group corresponding to a second performance frequency group with relatively low measurement requirements, adjusting the second performance frequency into the second performance frequency group with relatively high measurement requirements.

10. The method according to claim 1, wherein the measurement requirement comprises at least one of a measurement time interval or a measurement sampling point quantity.

11. A mobility measurement method in a radio resource control (RRC) idle or inactive state, applicable to a network device, the method comprising:
    configuring inter-frequency frequencies and configuration information for a terminal device, wherein the inter-frequency frequencies comprise at least one adjustable inter-frequency frequency and at least one nonadjustable inter-frequency frequency, and the terminal device is configured to adjust measurement attribute information of an adjustable inter-frequency frequency of the inter-frequency frequencies, according to a serving cell measurement result and the configuration information,
    wherein the measurement attribute information of the inter-frequency frequencies comprises a measurement requirement of frequencies of different frequency types, the different frequency types comprise a first performance frequency or a second performance frequency, and a measurement requirement of the second performance frequency is lower than a measurement requirement of the first performance frequency, and
    skipping adjusting measurement attribute information of the at least one non-adjustable inter-frequency frequency of the inter-frequency frequencies according to the inter-frequency frequencies and configuration information configured by the network device.

12. The method according to claim 11, before the configuring inter-frequency frequencies and configuration information for a terminal device, further comprising:
    receiving a user equipment (UE) capability reported by the terminal device, wherein the UE capability is used for indicating a maximum measurement quantity M of the first performance frequencies by the terminal device; and
    the configuring inter-frequency frequencies and configuration information for a terminal device comprises:
    configuring an N value less than or equal to the maximum measurement quantity M according to the UE capability, wherein the N value is a quantity of first performance frequencies to be adjusted by the terminal device.

13. The method according to claim 11, wherein the configuring inter-frequency frequencies and configuration information for a terminal device comprises:
    configuring at least one of the inter-frequency frequencies as an adjustable inter-frequency frequency; and
    configuring at least one of the inter-frequency frequencies as a nonadjustable inter-frequency frequency;
    or,
    configuring at least one first performance frequency as a high-priority frequency;
    or,
    configuring a plurality of second performance frequency groups, wherein each second performance frequency group corresponds to a respective preset signal quality threshold group and the measurement requirement;
    or,
    configuring a preset signal quality threshold group, wherein the preset signal quality threshold group comprises at least one threshold.

14. The method according to claim 12, wherein the configuring inter-frequency frequencies and configuration information for a terminal device comprises:
    configuring a plurality of adjustable inter-frequency frequency groups; and configuring a respective N value for each adjustable inter-frequency frequency group.

15. A terminal device, comprising:
    a memory, storing a computer program instruction; and
    a processor when executing the computer program instruction, implementing the following steps:
    receiving inter-frequency frequencies and configuration information configured by a network device, wherein the inter-frequency frequencies comprise at least one adjustable inter-frequency frequency and at least one nonadjustable inter-frequency frequency,
    adjusting measurement attribute information of an adjustable inter-frequency frequency of the inter-frequency frequencies, according to a serving cell measurement result of the terminal device and configuration information from a network device,
    wherein the measurement attribute information of the inter-frequency frequencies comprises a measurement requirement of frequencies of different frequency types, the different frequency types comprise a first performance frequency or a second performance frequency, and a measurement requirement of the second performance frequency is lower than a measurement requirement of the first performance frequency, and
    skipping adjusting measurement attribute information of the at least one non-adjustable inter-frequency frequency of the inter-frequency frequencies according to the inter-frequency frequencies and configuration information configured by the network device.

16. The terminal device according to claim 15, wherein the adjusting measurement attribute information of inter-frequency frequencies, according to a serving cell measurement result of the terminal device and configuration information from a network device comprises:
    within a first duration, if the first performance frequency meets the following condition, adjusting the first performance frequency to the second performance frequency, wherein
    signal quality of the first performance frequency remains less than a first threshold; or
    signal quality of the first performance frequency remains less than a first threshold, and signal quality of a serving cell remains greater than a second threshold; or
    signal quality of the first performance frequency remains less than a first threshold, and signal quality fluctuation of a serving cell remains less than a second threshold; or
    a difference between signal quality of the first performance frequency and signal quality of a serving cell remains greater than a third threshold; or
    a difference between signal quality of the first performance frequency and signal quality of a serving cell remains greater than a third threshold, and the signal quality of the serving cell remains greater than a second threshold; or
    a difference between signal quality of the first performance frequency and signal quality of a serving cell remains greater than a third threshold, and signal quality fluctuation of the serving cell remains less than a second threshold;
wherein
the first threshold, the second threshold, and the third threshold are comprised in a preset signal quality threshold group configured by the network device.

17. The terminal device according to claim 15, wherein the adjusting measurement attribute information of inter-frequency frequencies, according to a serving cell measurement result of the terminal device and configuration information from a network device comprises:
within a second duration, if the second performance frequency meets the following condition, adjusting the second performance frequency to the first performance frequency, wherein
signal quality of the second performance frequency remains greater than a fifth threshold; or
a difference between signal quality of the second performance frequency and the signal quality of the serving cell remains less than a sixth threshold;
signal quality of the second performance frequency remains less than a fifth threshold, and the signal quality of the serving cell remains less than a tenth threshold; or
signal quality of the second performance frequency remains less than a fifth threshold, and the signal quality fluctuation of the serving cell remains greater than a tenth threshold, wherein
the fifth threshold, the sixth threshold, and the tenth threshold are comprised in the preset signal quality threshold group configured by the network device.

18. The terminal device according to claim 17, before the adjusting measurement attribute information of inter-frequency frequencies, according to a serving cell measurement result of the terminal device and configuration information from a network device, further comprising:
reporting a user equipment (UE) capability to the network device, wherein the UE capability is used for indicating a maximum measurement quantity M of the first performance frequencies by the terminal device, and N is an integer less than or equal to M.

19. The terminal device according to claim 17, wherein the determining N inter-frequency frequencies with the highest signal quality as the first performance frequencies comprises:
determining N inter-frequency frequencies with the highest signal quality in a measured frequency group as the first performance frequencies; or
if there are unmeasured frequencies, marking unmeasured frequencies as the first performance frequencies, performing measurement on the unmeasured frequencies to obtain an inter-frequency measurement result corresponding to the unmeasured frequencies, updating the unmeasured frequencies as measured frequencies, and determining N inter-frequency frequencies with the highest signal quality in an updated measured frequency group as the first performance frequencies; or,
determining N inter-frequency frequencies with the highest signal quality corresponding to an end moment of the third duration as the first performance frequencies.

20. The terminal device according to claim 15, wherein the adjusting measurement attribute information of inter-frequency frequencies, according to a serving cell measurement result of the terminal device and configuration information from a network device comprises:
within a third duration, if signal quality of a serving cell remains greater than an eighth threshold, determining N inter-frequency frequencies with the highest signal quality as the first performance frequencies, wherein N is an integer greater than or equal to 1 and is configured by the network device, wherein the eighth threshold is comprised in a preset signal quality threshold group configured by the network device;
or,
within a fourth duration, if signal quality of a serving cell remains less than a ninth threshold, configuring all the inter-frequency frequencies as the first performance frequencies, wherein the ninth threshold is comprised in a preset signal quality threshold group configured by the network device.

* * * * *